(12) United States Patent
Gelardi et al.

(10) Patent No.: US 7,757,848 B2
(45) Date of Patent: Jul. 20, 2010

(54) PACKAGE WITH SECURITY FEATURES

(75) Inventors: John A. Gelardi, Kennebunkport, ME (US); James Kostyun, Pittsfield, MA (US); James Philippe, Sanford, ME (US); Kenny Freitag, Cheshire, MA (US)

(73) Assignee: MeadWestvaco Corporation, Richmond, VA (US)

( * ) Notice: Subject to any disclaimer, the term of this patent is extended or adjusted under 35 U.S.C. 154(b) by 252 days.

(21) Appl. No.: 11/584,288

(22) Filed: Oct. 20, 2006
(Under 37 CFR 1.47)

(65) Prior Publication Data
US 2008/0011625 A1    Jan. 17, 2008

Related U.S. Application Data

(60) Provisional application No. 60/728,456, filed on Oct. 20, 2005, provisional application No. 60/728,497, filed on Oct. 20, 2005, provisional application No. 60/728,612, filed on Oct. 20, 2005, provisional application No. 60/731,918, filed on Oct. 30, 2005, provisional application No. 60/755,458, filed on Dec. 30, 2005, provisional application No. 60/820,693, filed on Jul. 28, 2006.

(51) Int. Cl.
*B65D 85/30* (2006.01)
*A45C 13/10* (2006.01)

(52) U.S. Cl. .................. 206/308.2; 206/308.1; 206/1.5
(58) Field of Classification Search ................ 206/807, 206/308.2, 1.5, 308.1; 70/57.1
See application file for complete search history.

(56) References Cited
U.S. PATENT DOCUMENTS
D286,463 S    11/1986  Sfikas
(Continued)

FOREIGN PATENT DOCUMENTS
EP    0 233 163 A1    8/1987
(Continued)

OTHER PUBLICATIONS
International Search Report dated May 31, 2007.
(Continued)

*Primary Examiner*—Ehud Gartenberg
*Assistant Examiner*—Kaushikkumar Desai
(74) *Attorney, Agent, or Firm*—Thomas A. Boshinski

(57) ABSTRACT

Packages that include security features to inhibit tampering or theft are provided. Such packages can include locking elements to secure the packages in a closed configuration or can include active alarm elements to prevent tampering or theft. Additionally, such containers can include a novel hinge configuration, which allows an integrally formed hinge to be curved, and a spine of a package to have a generally arcuate cross-sectional contour.

12 Claims, 43 Drawing Sheets

U.S. PATENT DOCUMENTS

| | | | |
|---|---|---|---|
| 4,819,797 A * | 4/1989 | Holmgren | 206/309 |
| D324,609 S | 3/1992 | Yasuhara et al. | |
| D325,468 S | 4/1992 | Ohba | |
| D335,215 S | 5/1993 | Stumpff | |
| 5,267,647 A | 12/1993 | Stumpff et al. | |
| D347,728 S | 6/1994 | Taniyama | |
| 5,334,904 A | 8/1994 | Kramer | |
| 5,381,894 A | 1/1995 | Misterka et al. | |
| D359,193 S | 6/1995 | Minter | |
| 5,531,322 A | 7/1996 | Iwaki et al. | |
| D375,015 S | 10/1996 | Kobayashi et al. | |
| D375,864 S | 11/1996 | Taniyama | |
| D385,145 S | 10/1997 | VerWeyst et al. | |
| D391,437 S | 3/1998 | Moore et al. | |
| D392,500 S | 3/1998 | McEwan | |
| 5,740,155 A | 4/1998 | Spector | |
| D395,190 S | 6/1998 | Roth et al. | |
| 5,799,784 A | 9/1998 | Bosworth | |
| D401,463 S | 11/1998 | Cheris et al. | |
| D406,719 S | 3/1999 | Clausen | |
| 5,931,294 A | 8/1999 | Weingarden et al. | |
| 5,944,185 A * | 8/1999 | Burdett et al. | 206/1.5 |
| D419,359 S | 1/2000 | Eguchi et al. | |
| D420,240 S | 2/2000 | Sorenson et al. | |
| D420,832 S | 2/2000 | Cole, Sr. | |
| D422,428 S | 4/2000 | Pijanowski et al. | |
| D422,445 S | 4/2000 | Markowitz | |
| D422,455 S | 4/2000 | Kato | |
| D426,721 S | 6/2000 | Benden, Jr. et al. | |
| 6,164,446 A | 12/2000 | Law | |
| D437,505 S | 2/2001 | Fraser et al. | |
| D440,108 S | 4/2001 | Derman | |
| 6,227,362 B1 | 5/2001 | Cheung | |
| D450,973 S | 11/2001 | Bieda | |
| D452,104 S | 12/2001 | Tang | |
| D452,105 S | 12/2001 | Chan | |
| D452,793 S | 1/2002 | Lee | |
| D453,081 S | 1/2002 | Yu | |
| D455,595 S | 4/2002 | Ikeda et al. | |
| D456,201 S | 4/2002 | Hummell et al. | |
| 6,374,648 B1 * | 4/2002 | Mitsuyama | 70/57.1 |
| D459,935 S | 7/2002 | Takahashi et al. | |
| 6,412,631 B2 | 7/2002 | Belden, Jr. | |
| 6,450,332 B1 | 9/2002 | Courchesne | |
| D465,960 S | 11/2002 | Yau | |
| 6,474,470 B2 * | 11/2002 | Byrne et al. | 206/308.2 |
| D470,707 S | 2/2003 | Lopez Mas | |
| 6,619,079 B2 * | 9/2003 | Cheung | 70/57.1 |
| D481,251 S | 10/2003 | Yau | |
| D484,352 S | 12/2003 | Palmer | |
| D492,535 S | 7/2004 | Hiramatsu | |
| D493,661 S | 8/2004 | Yau | |
| D495,913 S | 9/2004 | Hsiao | |
| D497,074 S | 10/2004 | Dardashti | |
| D497,508 S | 10/2004 | Dardashti | |
| D505,565 S | 5/2005 | Chen | |
| 6,907,987 B2 * | 6/2005 | Lee | 206/308.2 |
| D518,676 S | 4/2006 | Lee et al. | |
| 7,028,835 B1 | 4/2006 | Rajter, Jr. | |
| 7,044,296 B2 | 5/2006 | Solling | |
| D522,791 S | 6/2006 | Ho | |
| 7,320,235 B2 * | 1/2008 | Belden et al. | 70/57.1 |
| D570,635 S | 6/2008 | Pozzoli | |
| D572,962 S | 7/2008 | Freitag et al. | |
| D572,963 S | 7/2008 | Gelardi et al. | |
| D572,964 S | 7/2008 | Gelardi et al. | |
| D573,831 S | 7/2008 | Gelardi et al. | |
| 7,416,079 B2 | 8/2008 | Osborn et al. | |
| 7,428,968 B2 | 9/2008 | Osborn et al. | |
| 2002/0033348 A1 | 3/2002 | Flores, Jr. et al. | |
| 2002/0038769 A1 | 4/2002 | Hegarty et al. | |
| 2003/0029761 A1 | 2/2003 | Onmori et al. | |
| 2003/0075463 A1 | 4/2003 | Perez et al. | |
| 2003/0106814 A1 | 6/2003 | Gelardi et al. | |
| 2003/0116455 A1 | 6/2003 | Marsilio et al. | |
| 2003/0121296 A1 | 7/2003 | Cheung | |
| 2003/0132126 A1 | 7/2003 | Parrotta et al. | |
| 2003/0146119 A1 | 8/2003 | Lee | |
| 2003/0169680 A1 | 9/2003 | Volan et al. | |
| 2003/0196916 A1 | 10/2003 | Jakobowicz | |
| 2004/0108230 A1 | 6/2004 | Hsu | |
| 2004/0188286 A1 | 9/2004 | Lax et al. | |
| 2004/0195123 A1 | 10/2004 | Bird et al. | |
| 2004/0245128 A1 | 12/2004 | MacColl et al. | |
| 2005/0077196 A1 | 4/2005 | Corley et al. | |
| 2005/0121950 A1 | 6/2005 | Hegarty et al. | |
| 2005/0160774 A1 | 7/2005 | Weinstein et al. | |
| 2005/0230274 A1 | 10/2005 | Preece et al. | |
| 2005/0241970 A1 | 11/2005 | Choi | |
| 2006/0124479 A1 | 6/2006 | Osborn et al. | |
| 2006/0191809 A1 | 8/2006 | Heuser et al. | |
| 2007/0163902 A1 | 7/2007 | Osborn et al. | |
| 2007/0267305 A1 | 11/2007 | Johnston et al. | |
| 2008/0011625 A1 | 1/2008 | Gelardi et al. | |
| 2008/0156682 A1 | 7/2008 | Choi et al. | |
| 2008/0289980 A1 | 11/2008 | Johnston | |
| 2009/0032416 A1 | 2/2009 | Osborn et al. | |

FOREIGN PATENT DOCUMENTS

| | | |
|---|---|---|
| EP | 0765734 A | 4/1997 |
| FR | 2859189 A1 | 5/2005 |
| GB | 2242387 A | 10/1991 |
| NL | 1019235 C2 | 4/2003 |
| WO | WO9312993 A1 | 7/1993 |
| WO | WO9849684 A1 | 11/1998 |
| WO | WO 99/59153 | 11/1999 |
| WO | WO0143132 A1 | 6/2001 |
| WO | WO 2006/058119 A1 | 6/2006 |
| WO | WO2007133591 A2 | 11/2007 |

OTHER PUBLICATIONS

International Search Report WO2007047797A3, dated Apr. 26, 2007.

* cited by examiner

PACKAGE WITH SECURITY FEATURES

CROSS-REFERENCE TO RELATED APPLICATIONS

This application claims the benefit under 35 U.S.C. §119 of U.S. provisional applications 60/728,456, 60/728,497, and 60/728,612 each filed Oct. 20, 2005, 60/731,918 filed Oct. 30, 2005, 60/755,458 filed Dec. 30, 2005, and 60/820,693 filed Jul. 28, 2006. Each of the foregoing applications is hereby incorporated by reference in its entirety

BACKGROUND OF THE INVENTION

1. Field of the Invention

The present invention relates to packaging for carrying items, particularly merchandise offered for sale. More particularly, the present invention is directed to packaging having security features to prevent or inhibit tampering with or theft of the package contents.

2. Description of Related Art

Packaging, including containers, boxes and cases of all types have been specifically designed for storing items for transport and display for centuries. As society has evolved from small, low traffic general stores to mass market super stores, the ability of the shopkeeper to effectively police their floor has diminished. In response, tamper evident, tamper proof packages and security devices therefor have proliferated in more recent years.

In a pharmacy setting, package safety measures have become increasingly important in maintaining the integrity of the products sold. For some products, the pharmacist requires the ability to temporarily access the contents of the package and, subsequently, reactivate the tamper mechanisms.

In response to these needs, many in-store security systems put products in an external case and/or wrap a device around the product. The outer case and wrap visually disrupt the presentation of the product. However, additional cost is associated with such outer cases and wraps, at least in-part due to the labor required for insertion and removal of the product and to wasted material. In many instances the outer cases or wraps are welded shut and require a knife to cut open the security outer case or wrap. In some instances, the outer security device is used with an unlocking device that requires training to use, and time to manipulate. The unlocking of a mechanical outer case and/or electromechanical security system decreases the rate at which a clerk can ring up products at a cash register. Moreover, such outer security cases consume additional space on a retail shelf. Further, known electronic security devices that use cables to wrap around a package or product can damage the package and prevent the package from sitting flat on a shelf.

One particular segment of the marketplace, which is particularly susceptible to theft, is that of recorded media products, including music, video and video games, for example. Packages for containing such media, such as media recorded on optical discs, can greatly benefit from enhanced security features.

In view of the foregoing, there is a need for packaging that provides indication of tampering with the package. Also, a need exists for packages that prevent theft, which can optionally facilitate apprehension of a perpetrator. Further, there is a need for packaging that allows selective access to the contents. The present invention provides a solution for these needs and addresses the main problems with prior technologies.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied, the invention includes, in one aspect, a package in the form of a case having a cover, and a security mechanism. A cover portion is hingedly connected to a base portion. A recess is defined by a first side of the cover portion and a first side of the base portion. A security bar is hingedly connected to the one of the sides and aligned with the recess. A security mechanism included therewith includes locking elements and snapping elements. The locking elements releasably secure the base portion to the cover portion, and the snapping elements releasably secure the security bar to one of the cover and base portion.

In accordance with another aspect, the invention provides a package in the form of a case with a base portion including a base first side and a cover portion including a cover first side hingedly connected to the base. The case further includes at least one cover security rib extending from the cover first side to a cover second side. The security rib includes a first edge proximate to the top edge of the cover first side, and a distal second edge proximate to the top edge of the cover second side. At least one base security rib extends from the base first side to a base second side, and at least one stop rib is affixed to the cover portion proximate to the cover security rib, and is substantially aligned with the cover first side.

In accordance with the invention, the case can include at least one stop rib affixed to the base portion proximate to the cover security rib and substantially aligned with the base first side. The case can include at least one base security rib and/or at least one alignment rib positioned on one of the security ribs. Such alignment rib(s) can be tapered. Additionally or alternatively, the case can include at least one interlock and/or a recessed branding bar on one of the base and cover portions.

In accordance with a further aspect of the invention, a package is provided, which includes a base portion, a cover portion and at least one pair of security ribs. The base portion includes a base first side. The cover portion includes a cover first side hingedly connected to the base first side. The security ribs extend from at least one of the cover first side and the base first side to at least one of a cover second side and a base second side. The pair of security ribs include a first edge proximate to the top edge of at least one of the cover first side and the base first side, and a distal second edge proximate to the top edge of at least one of the cover second side and the base second side. The case further includes at least one stop rib affixed to at least one of the cover portion and the base portion proximate to the pair of security ribs and substantially aligned with one of the cover first side and the base first side, and at least one item enclosed within the case.

In accordance with this aspect of the invention, at least one alignment rib can be affixed to a side of the pair of security ribs, which alignment rib can be tapered. The case can additionally or alternatively include at least one interlock and/or a recessed branding bar on one of the base and cover portions.

The invention also provides, in one aspect, a method of fulfilling a case, including: providing a case, inserting at least one item into the case, rotating a first portion of the case towards a second portion, where the first portion is restricted from rotating to an angle approximately greater than ninety-degrees by at least one of stop rib, and closing the case, such that the case is aligned during closure by the stop rib.

In accordance with this aspect, the method can include a first portion security rib interfacing with a second portion security rib, having first and second edges, wherein the first edge is proximate to the top edge of the first portion and the second edge proximate to the top edge of the first portion. The method can further include the step of closing being further aided by a second pair of interfacing security ribs. Optionally, at least one alignment rib can be affixed to one of the security ribs. If desired, the alignment rib(s) can be tapered.

In accordance with another aspect of the invention, an anti-theft package is provided, having a container defining an interior for storing an item and an alarm module selectively attached to the container. The alarm module is configured to be set off when removed from the container unless suppressed by an RF signal. The package can further include a grid coupled to the container and the alarm module, such that the grid must be broken to remove the item from the interior, wherein the alarm module triggers upon breaking of the grid. The alarm module can be provided with contacts for coupling to the grid.

In accordance with another aspect of the invention, a tamper evident package is provided, having a container, a conductive grid and an alarm module. The container defines an interior for storing an item. The conductive grid is coupled to the container such that the grid must be broken to remove the item from the interior and the alarm module is connected to the grid and configured to trigger upon breaking of the grid. Optionally, the alarm module can be inactive during shipment and/or shelf storage and can become active upon removal from shelf storage. Further, the alarm module can be embodied so as to emit an audible alarm. The alarm module can be deactivated by application of a magnetic field or RFID signal thereto.

Further in accordance with the invention, a kit is provided, having a transmitter for sending a signal and a plurality of alarm modules configured to receive the signal and to deactivate upon receipt of the signal.

It is to be understood that both the foregoing general description and the following detailed description are exemplary and are intended to provide further explanation of the invention claimed.

BRIEF DESCRIPTION OF THE DRAWINGS

The accompanying drawings, which are incorporated in and constitute part of this specification, are included to illustrate and provide a further understanding of the method and system of the invention. Together with the description, the drawings serve to explain the principles of the invention, wherein.

DETAILED DESCRIPTION

Figure 1:
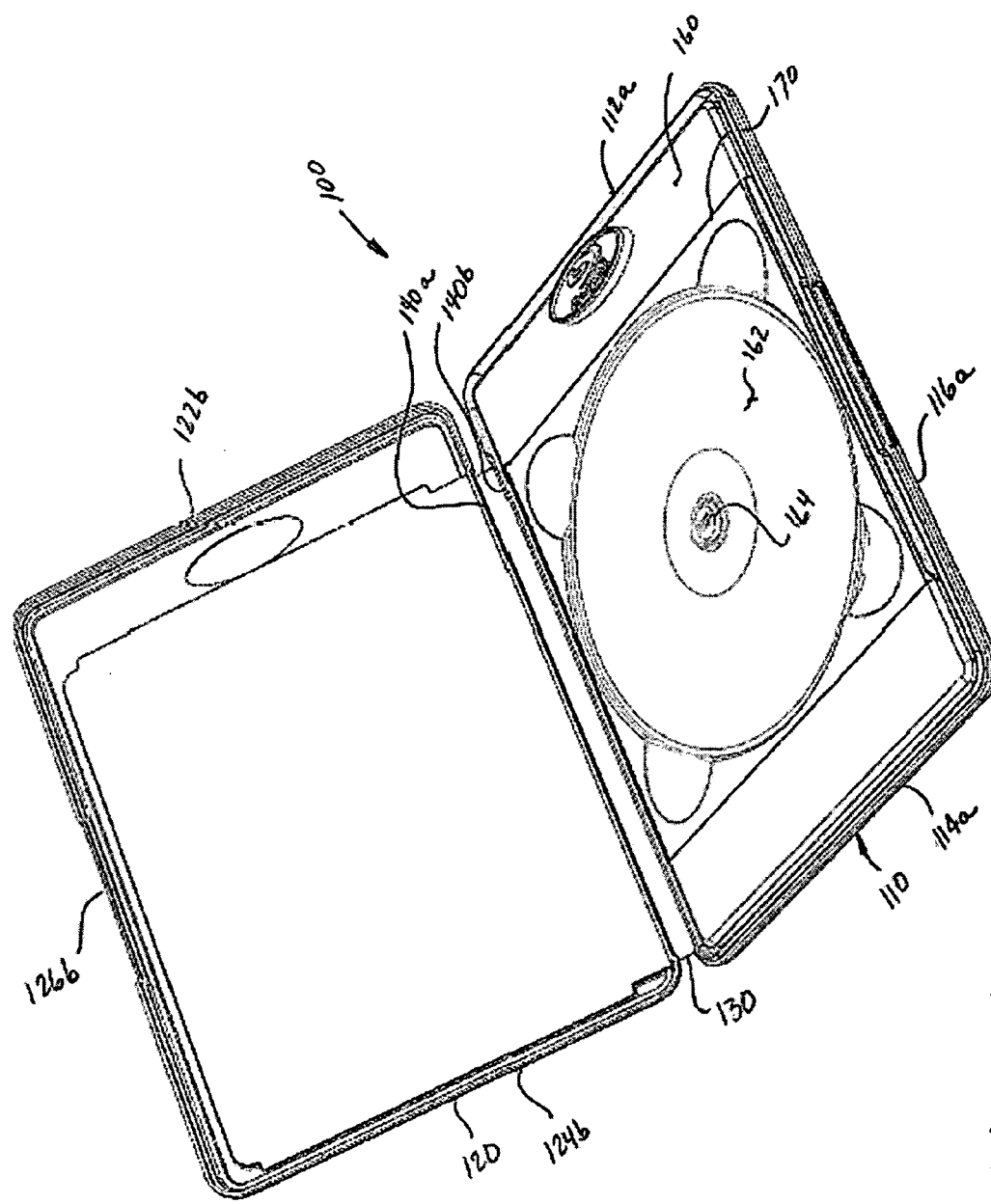
FIG. 1 is a perspective view of a package configured to hold a compact disc, constructed in accordance with an embodiment of present invention, the package having a security band wrapped around the disc and insert tray.

Reference will now be made in detail to the present preferred embodiments of the invention, examples of which are illustrated in the accompanying drawings. The method and corresponding steps of the invention will be described in conjunction with the detailed description of the system.

The devices and methods presented herein may be used for storage, transport and/or display of merchandise. The present invention is particularly suited for merchandise that is susceptible to tampering or theft.

In accordance with the invention, FIGS. 1-14 are directed to packages, particularly packages for carrying media discs, such as compact discs, including audio discs, DVDs, Blu-Ray and HD-DVD discs, and the like, which packages include security features for preventing the tampering with or theft of the packages. It should be noted that the packages described herein can be adapted to hold any desired item, and are not limited to holding such media discs. Several security features are provided, which can be used alone or in combination to reduce/eliminate theft and/or tampering.

Referring now to FIGS. 1 through 6 which illustrate selected embodiments of the packages in accordance with the invention which have been designated generally by reference numerals 100 (FIGS. 1-2) and 200 (FIGS. 3-6). Packages 100, 200 each include a base portion 110, 210, a cover portion 120, 220 and a spine section 130, 230. The base and the cover portions of package 100 are joined to the spine section by living hinges 140a and 140b. The base and cover portions of packages 100 and 200, each include three end sections which are adapted to mate when the package 100,200 is in the closed position. For example, for package 100, base portion 110 includes top end 112a, bottom end 114a and side end 116a which are adapted to mate with top end 122b, bottom end 124b and side end 126b associated with cover portion 120. Each of these end sections has a curved surface profile so that when the package 100 is in the closed position the package ends are rounded or curved.

Figure 4:
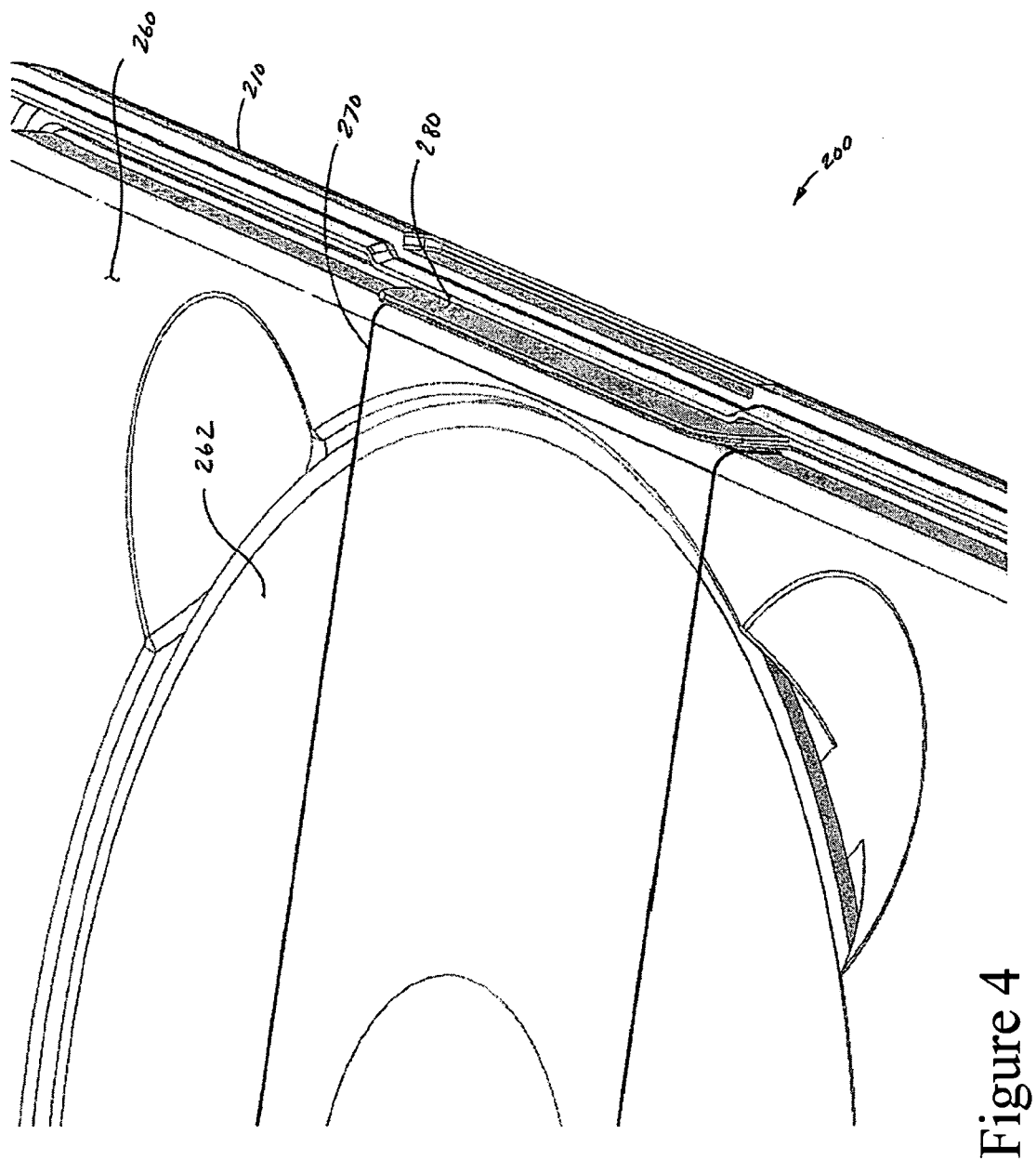
FIG. 4 is an enlarged perspective view of the compact disc package of FIG. 3 illustrating a security bar formed in the based of the package which is positioned between the lateral edge of the package and the security band.

Compact disc packages 100 and 200 each include an insert tray 160, 260 on which the disc 162, 262 is secured via a rosette 164, 264, for example. Also provided with packages 100 and 200 is a securing band 170, 270 which is wrapped around the insert tray 160, 260 and disc 162, 262. The security bands 170, 270 prevent an individual from stealing discs 162, 262 by prying open one of the package ends and removing the discs 162, 262. As shown in FIG. 4, certain embodiments of the disclosed package can include a rib shield 280 which is disposed within the package between the lateral edge of package 200 and security band 270. Rib shield 280 prevents an individual from being able to insert a knife or blade between the pried open lateral end of package 200 so as to cut security band 270. Such features will be described in more detail below, in connection with the embodiment of FIGS. 24-28.

Figure 2:
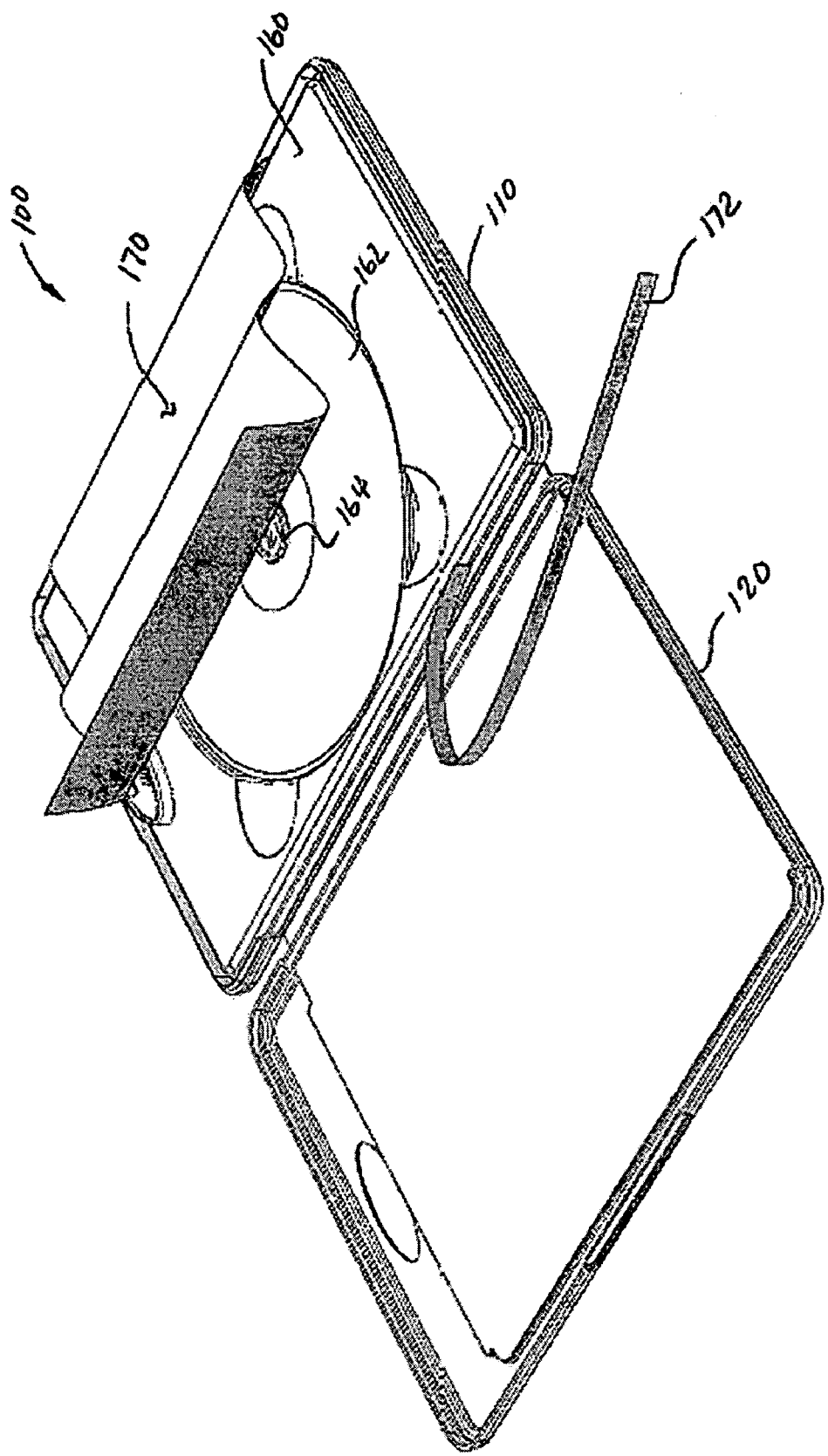
FIG. 2 is a perspective view of the compact disc package of FIG. 1 shown having the perforation strip removed from the spine edge of the security band.
Figure 3:
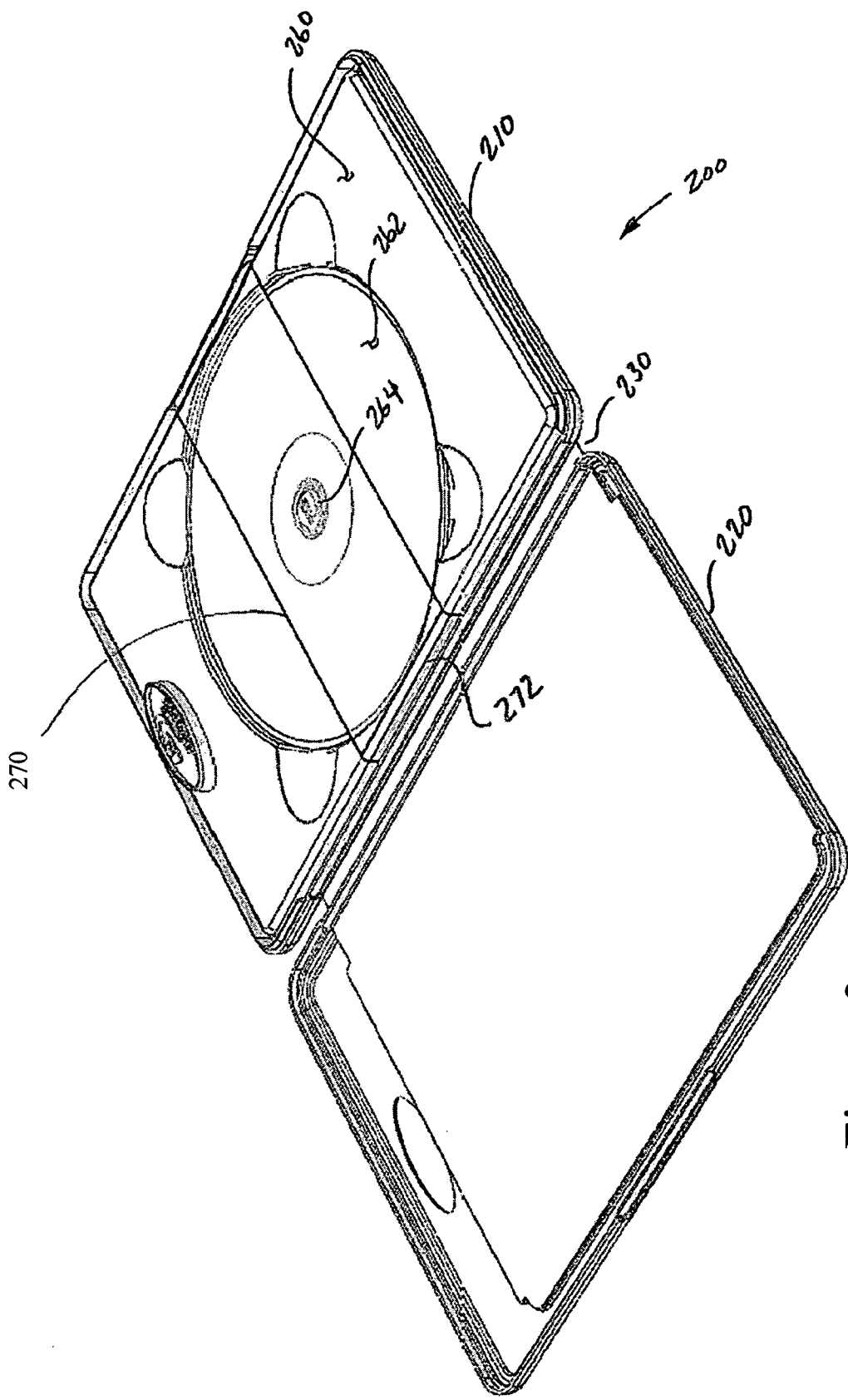
FIG. 3 is a perspective view of a further embodiment of the present invention having a security band wrapped around a portion of the disc and insert tray.
Figure 5:
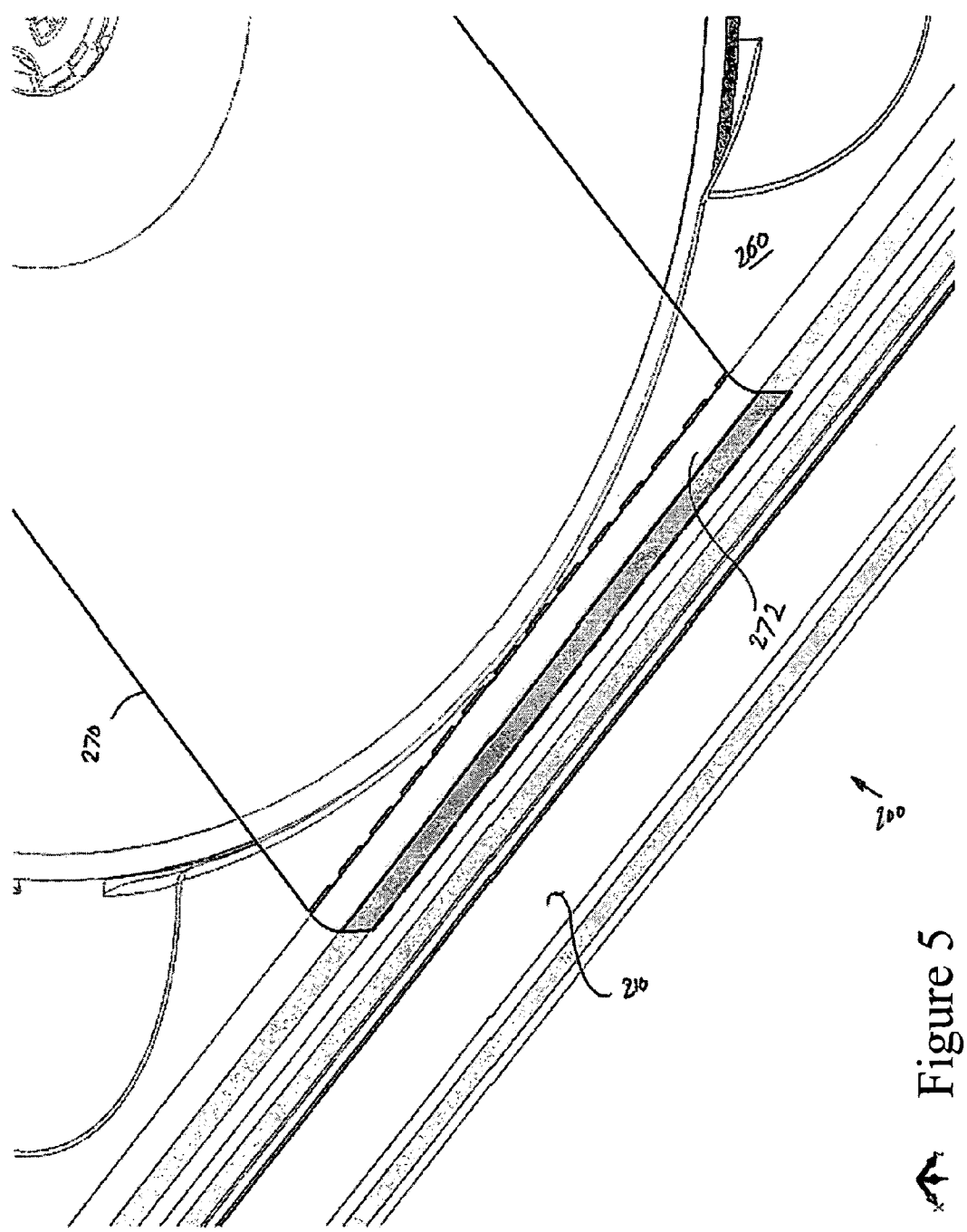
FIG. 5 is an enlarged perspective view of the compact disc package of FIG. 3 illustrating the perforated strip formed in the security band along its spine edge.
Figure 6:
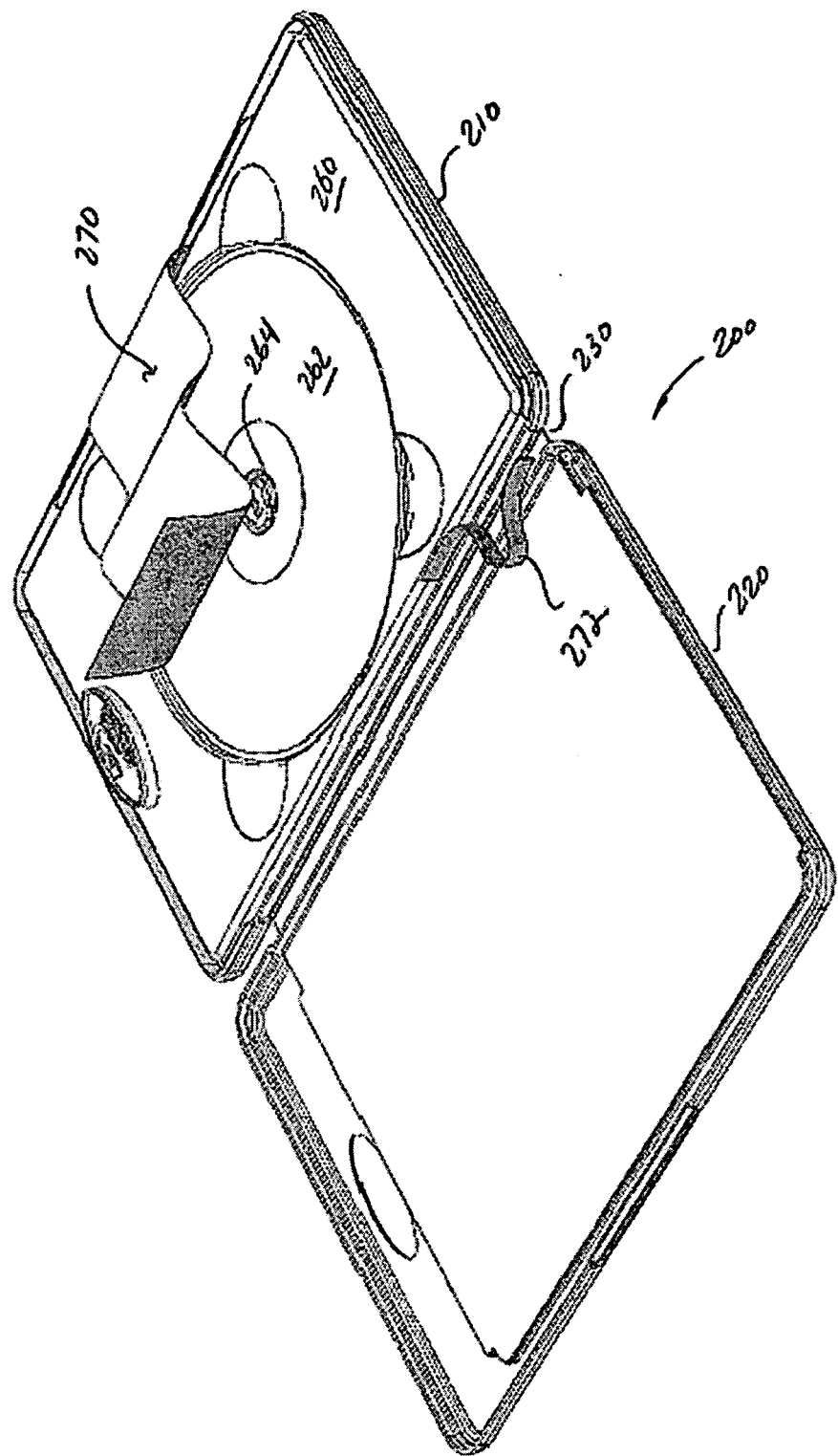
FIG. 6 is a perspective view of the compact disc package of FIG. 3 shown having the perforation strip removed from the spine edge of the security band.

As shown in FIGS. 2, 5 and 6, the security bands 170, 270 can be provided with a perforated strip 172,272 that is formed using techniques such as microperforation. Preferably, the strip 172,272 is positioned adjacent to the spine of the package and away from the top, bottom or lateral edges of the package. The perforated strip 170, 270 will allow the security bands to be removed when the package is open.

A representative method for manufacturing packages 100 and 200 can be described as follows. First, secure the disc to the rosette of the insert tray. Second, band the disc to the insert tray using the security band. Insert the secured and banded disc tray assembly into the base portion of the package.

As noted above, the security band has a perforated strip located near the inner spine of the package. The perforated strip can only be accessed for removal when the package is fully opened. When the perforated strip is removed the remaining open belt portion of the security band can be pulled from under the insert tray and removed completely from the package. Those skilled in the art would readily appreciated that the security band could be made from a variety of material such as, for example, paper and plastic (e.g., polyethylene, high-density polyethylene, Polylith), can include graphics and/or be opaque or clear. Additionally, a variety of band widths can be utilized without departing from the inventive aspects of this aspect of the invention.

FIGS. 7-23 illustrate several embodiments of a tamper evident security feature for use with packages, particularly media packages. In general the packages illustrated in FIGS. 7-23 each include a tamper evident security bar 790, 1290, 1560, 2160, respectively which, unlike conventional security bars, is integrally molded with the base of the package.

Figure 7:
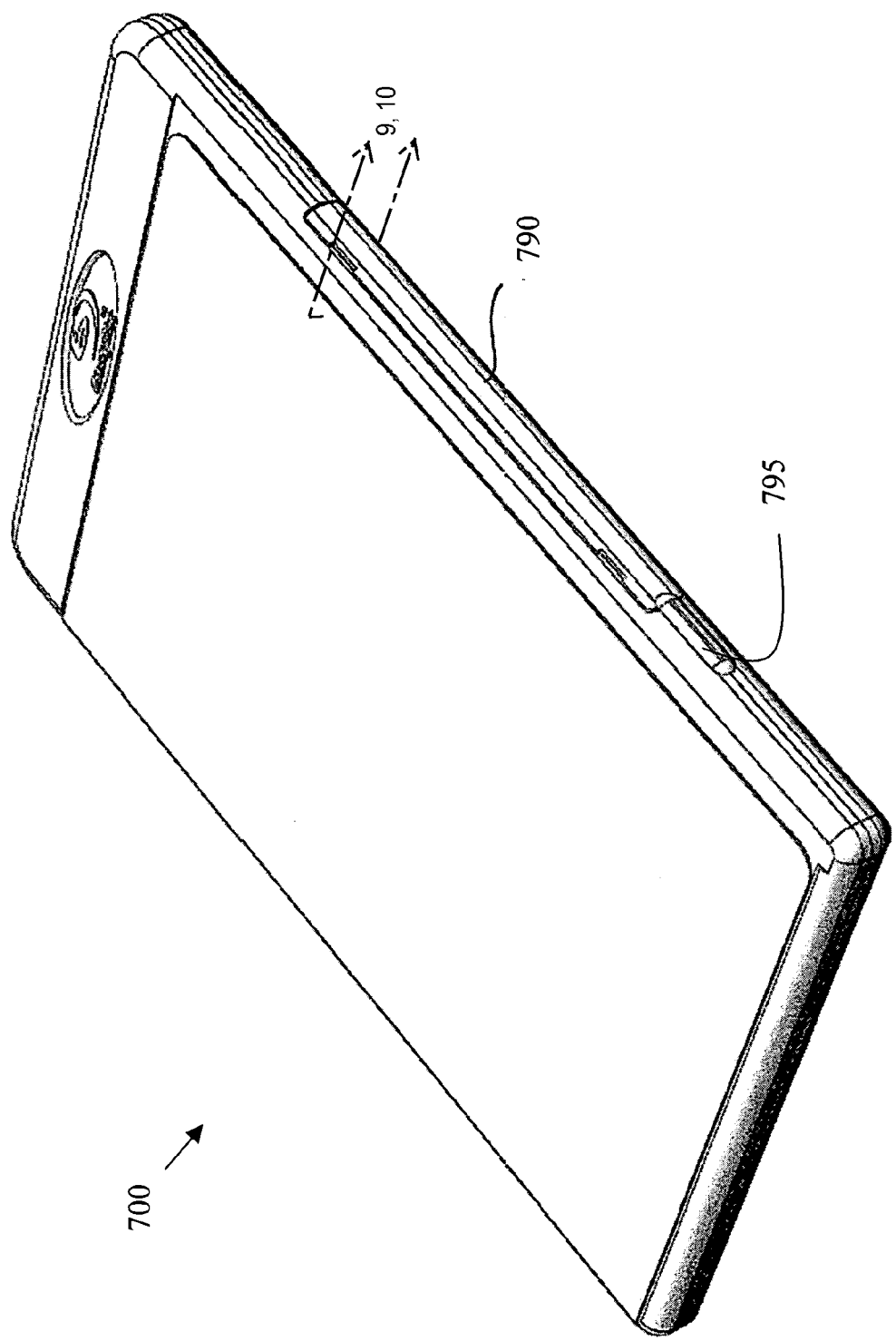
FIGS. 7-14 illustrate packages having tamper evident features wherein the packages include a integrally molded tamper evident security bar.
Figure 8:
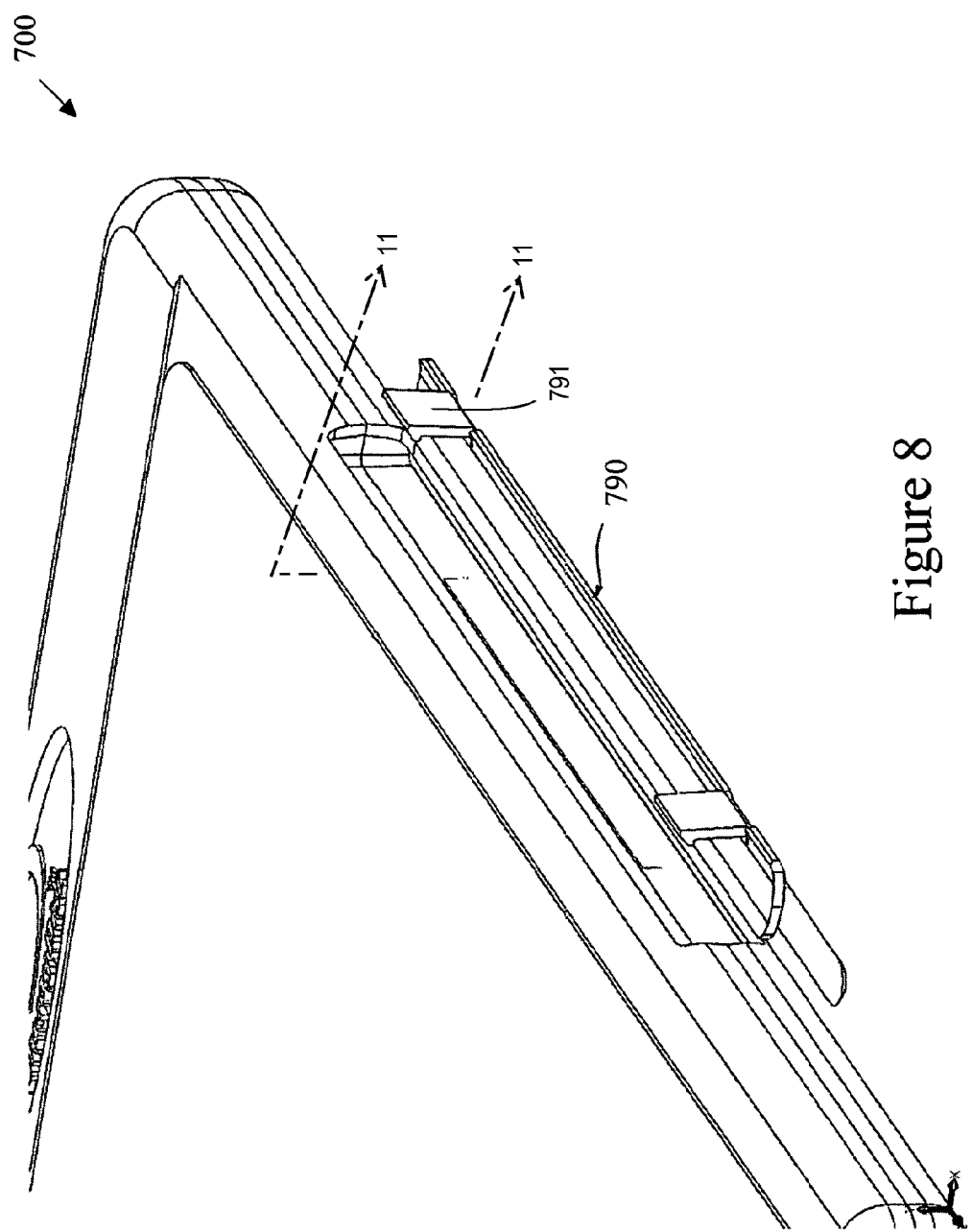
Figure 9:
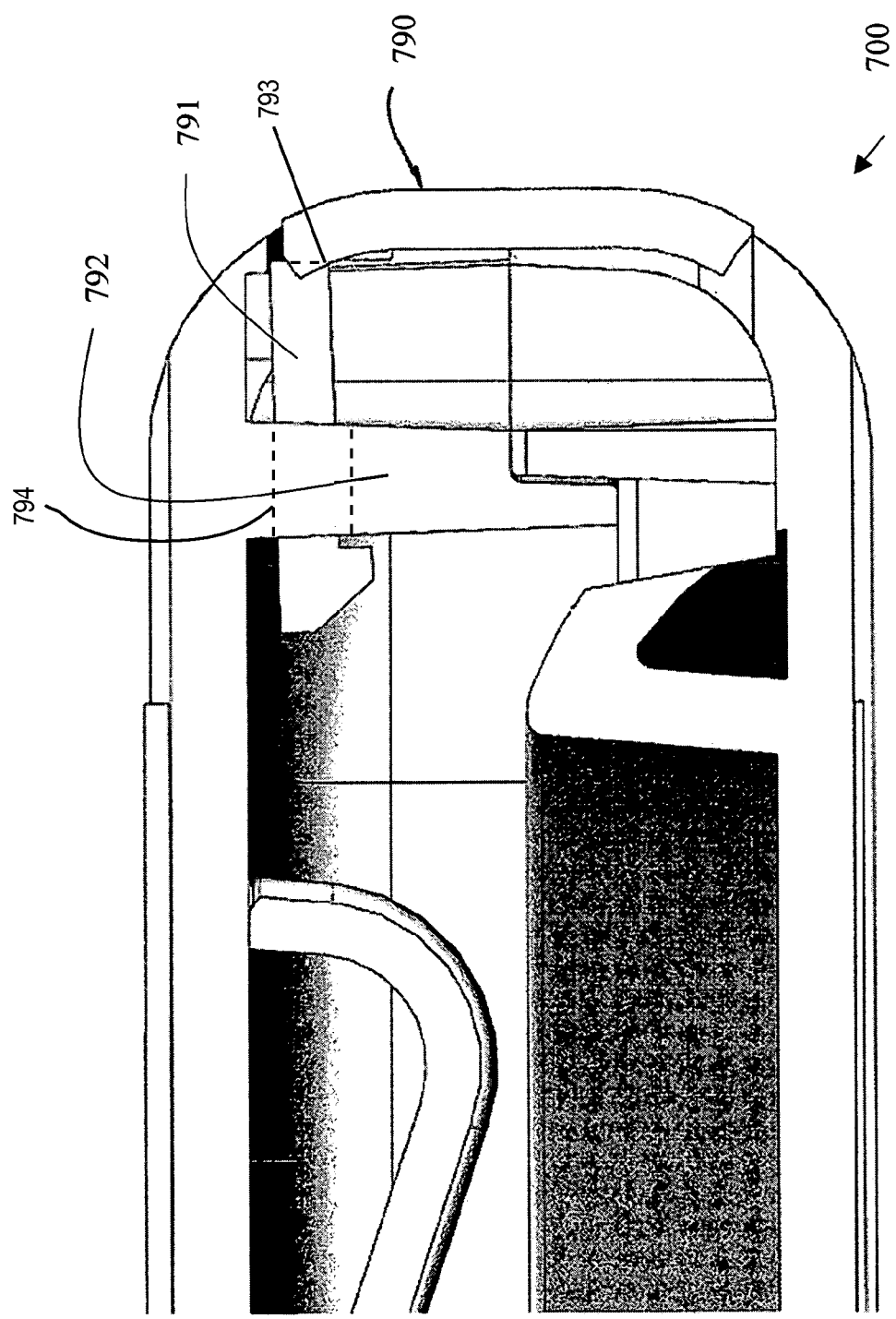
Figure 10:
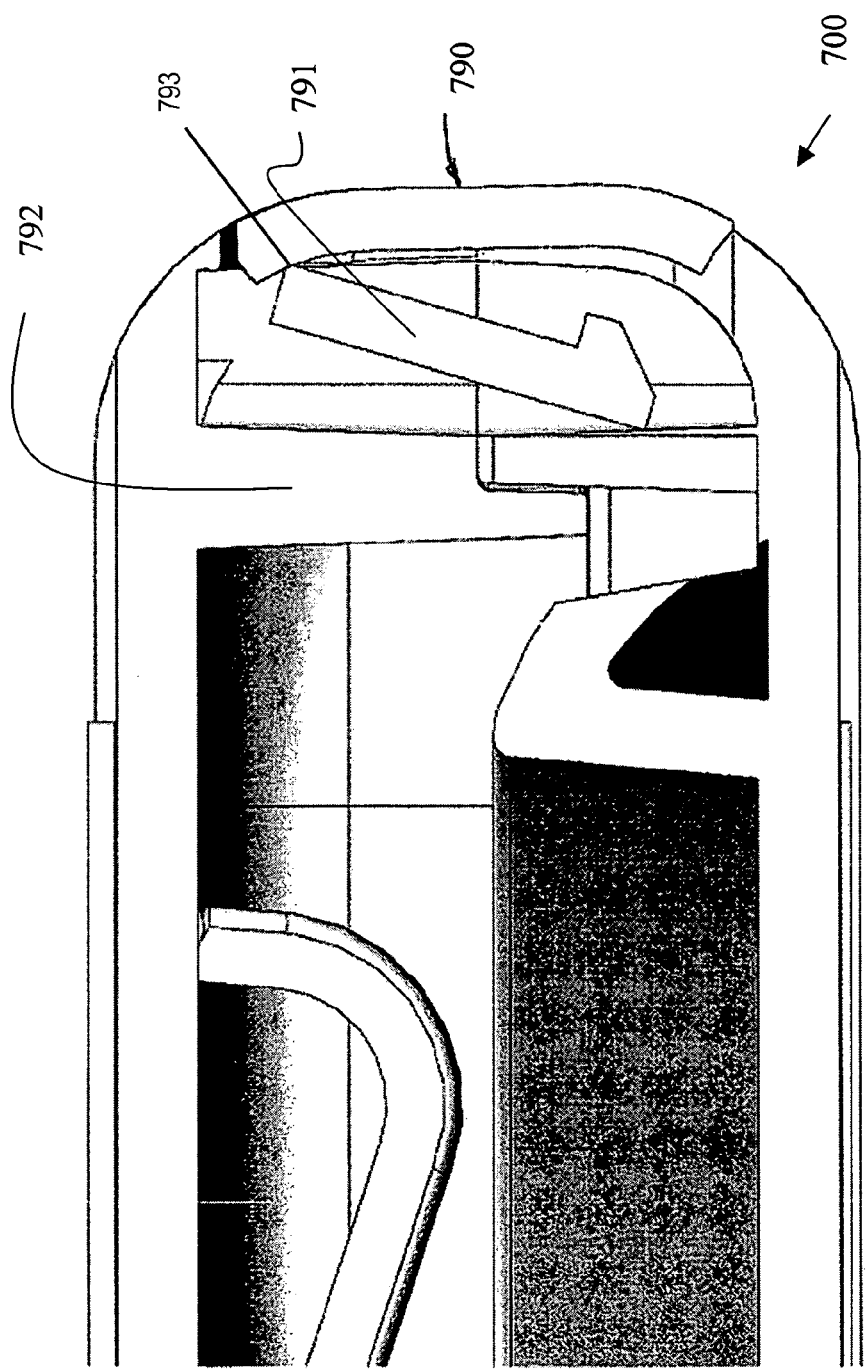

FIGS. 7-11 illustrate a locking or "security bar" 790, having a pull tab 795 (FIG. 7) and latching pawls 791. FIG. 8 illustrates the security bar 790 in the disengaged position prior to locking the package 700. One advantage of the present construction is that the security bar 790 can be placed in a shipping position (See FIG. 10), wherein the locking features, in this case, the latching pawls 791 are folded along lock hinge 793 prior to closure of the bar 790 and therefore are not engaged with a mating component of the package 700. In contrast, FIG. 9 illustrates the security bar 790 in the secured position, latched to a mating element 792, in which the package 700 cannot be opened without removing the bar 790 from the package 700. As can be seen, FIG. 7 illustrates the package 700 in a closed condition, and FIG. 10 is a side view, illustrating the security bar 791 in an open position.

Figure 11:
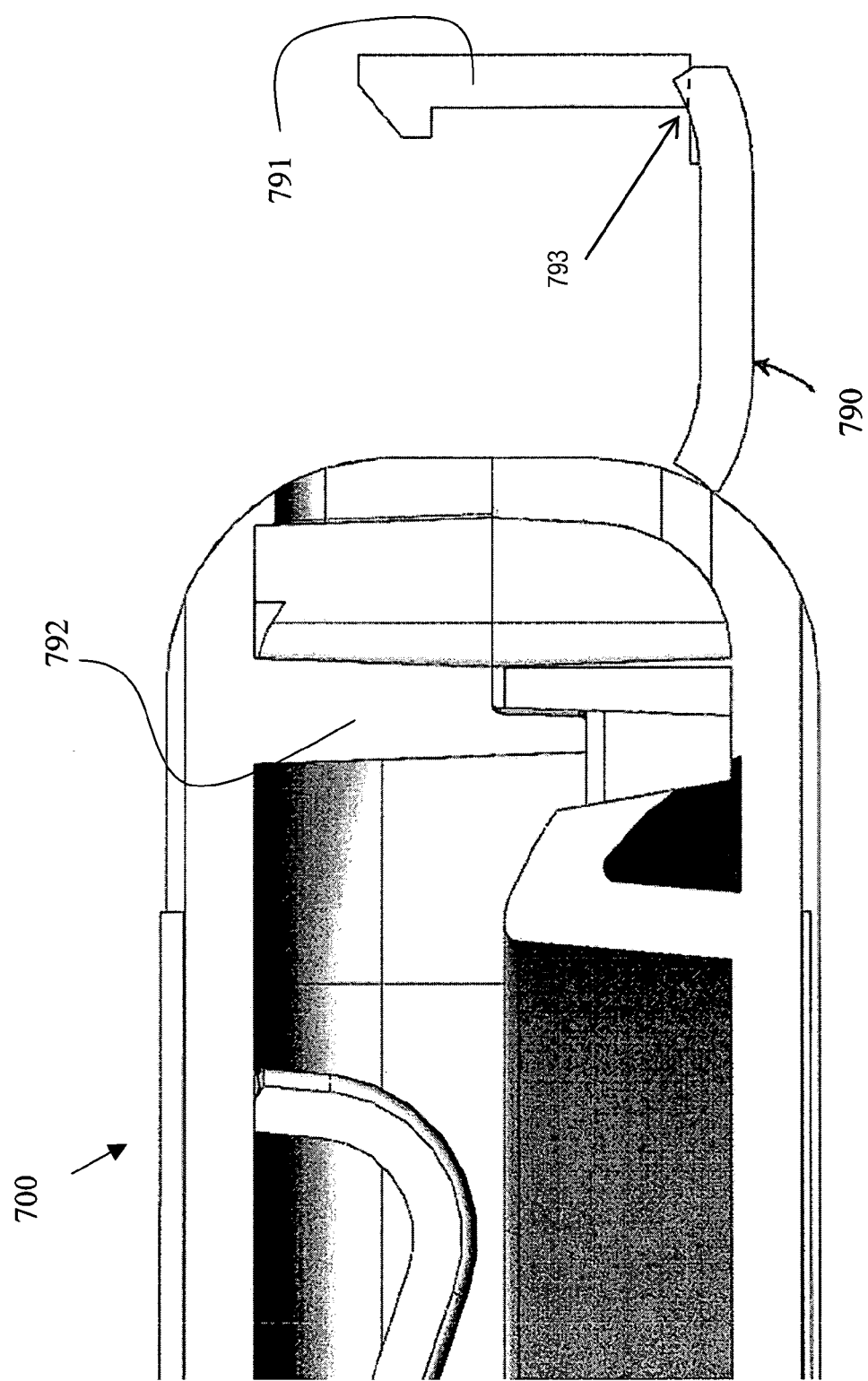

It is envisioned that, in use, the package 700 would first be molded as shown in FIG. 11. Then, the security bar 790 would then be placed into the shipping position as detailed in FIG. 10. The case 700 would be closed, and shipped to the supplier where media or other product would be inserted. The case 700 would then be opened, loaded with its content, and the latching pawls 791 of the locking element 790 would be unfolded and then engaged with holes 794 provided in the mating element 792 of the cover of the package 700 in order to secure the package in the closed position. To remove the security bar 790, the consumer would peel the bar 790 from one end, such as pull tab 795 of FIG. 7, pulling along the length of the case 700.

Figure 12:
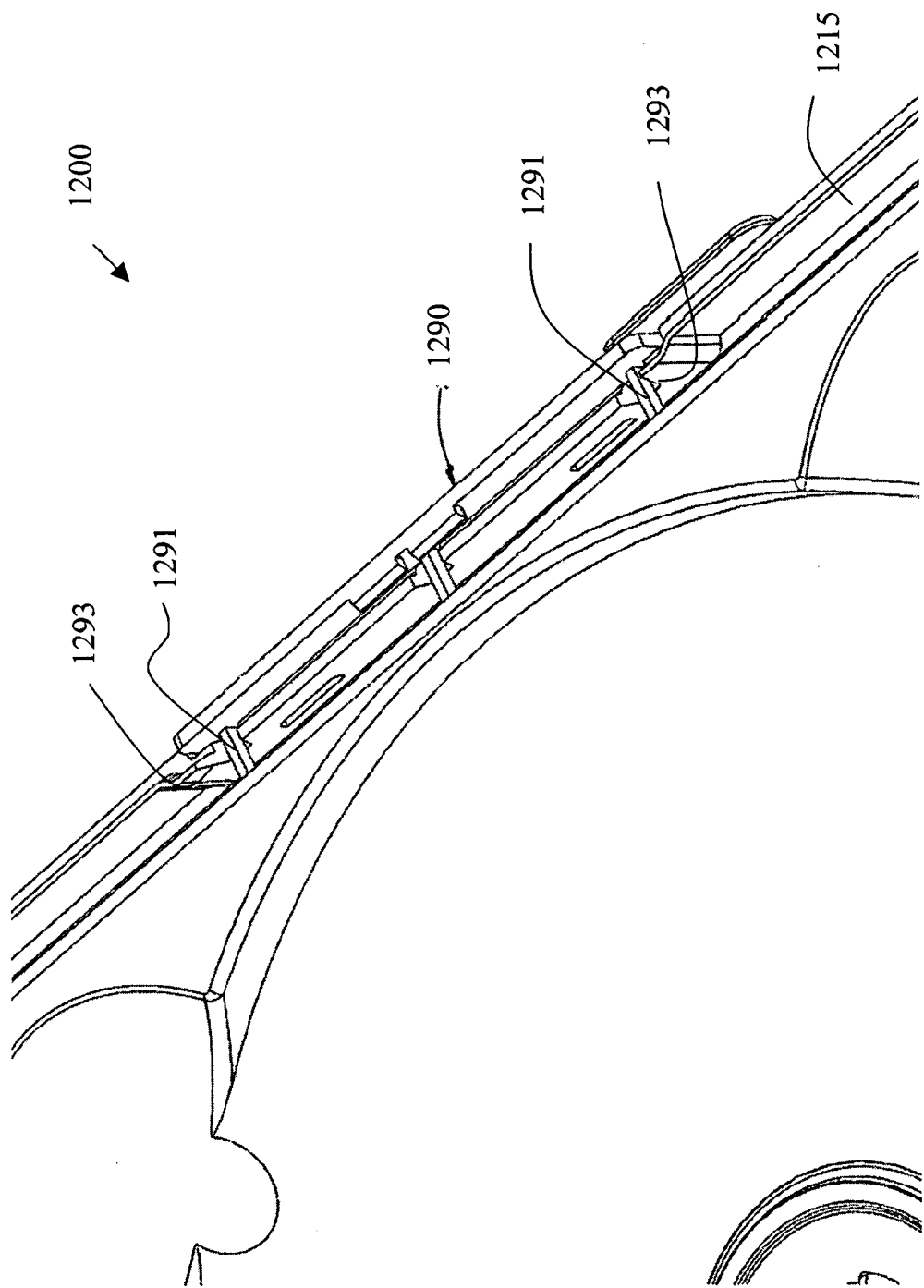
Figure 13:
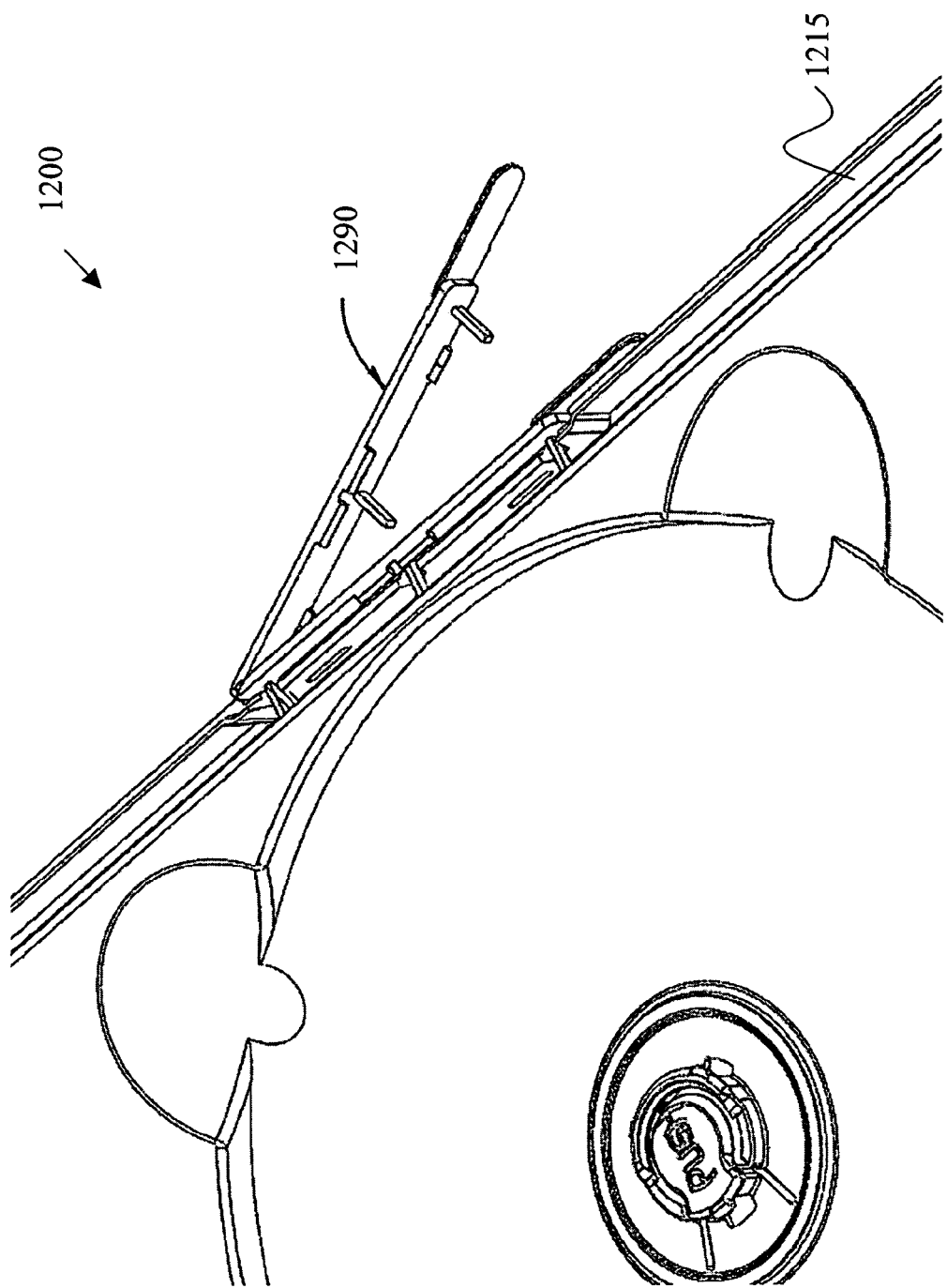
Figure 14:
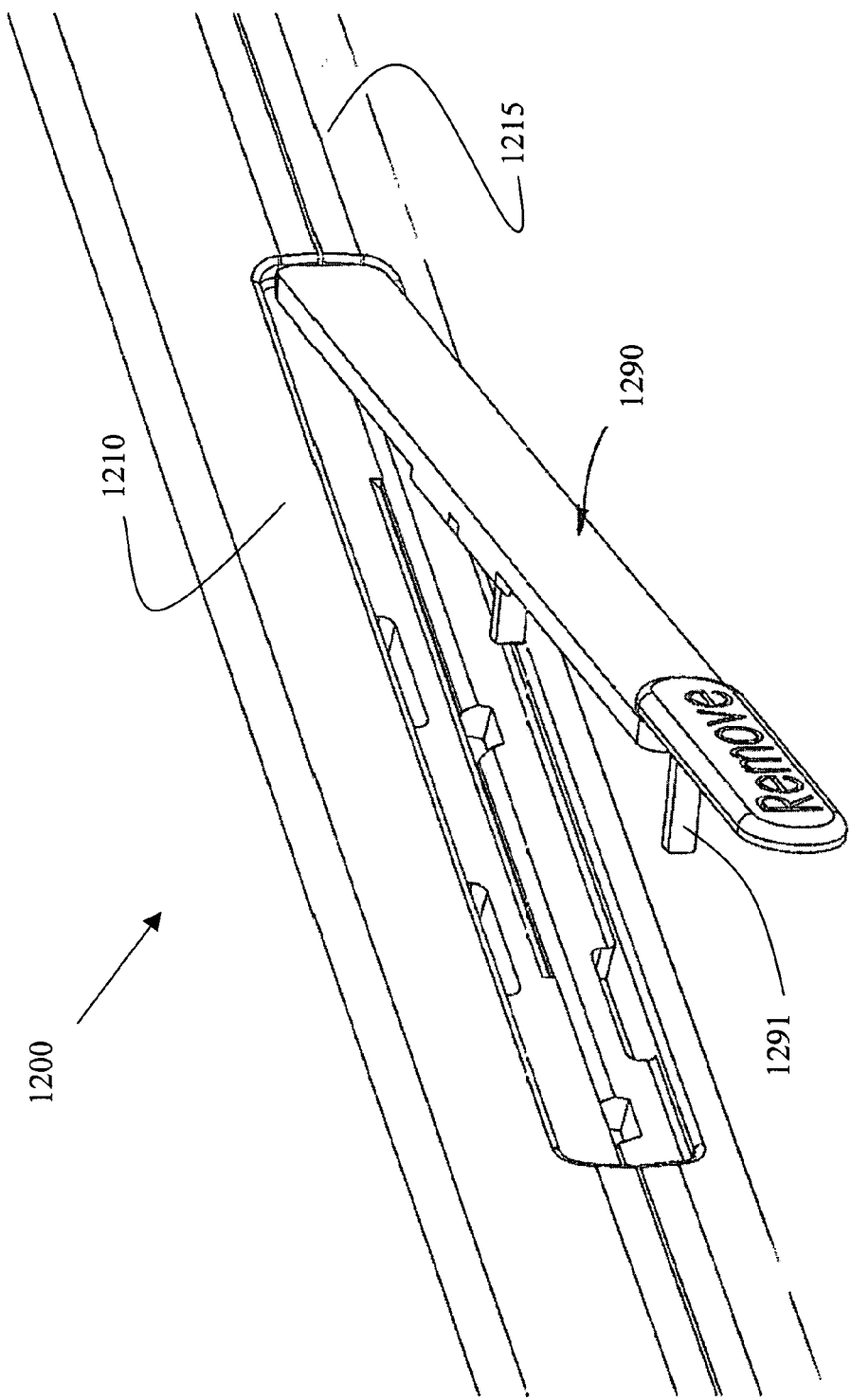

FIGS. 12-14 illustrate a further embodiment of a package with security bar 1290 in accordance with the invention. In contrast with the foregoing embodiment of a security bar 790 of FIGS. 7-11, the security bar 1290 includes a plurality of straight locking elements 1291, which engage apertures 1293 in the container lid 1210 (FIG. 14). The security bar 1290, as with the security bar 790 of FIGS. 7-11, is attached to the container base 1215. The security bar 1290 can be torn from the base 1215, thereby disengaging the locking elements 1291 from the apertures 1293, allowing the case 1200 to open.

Figure 15:
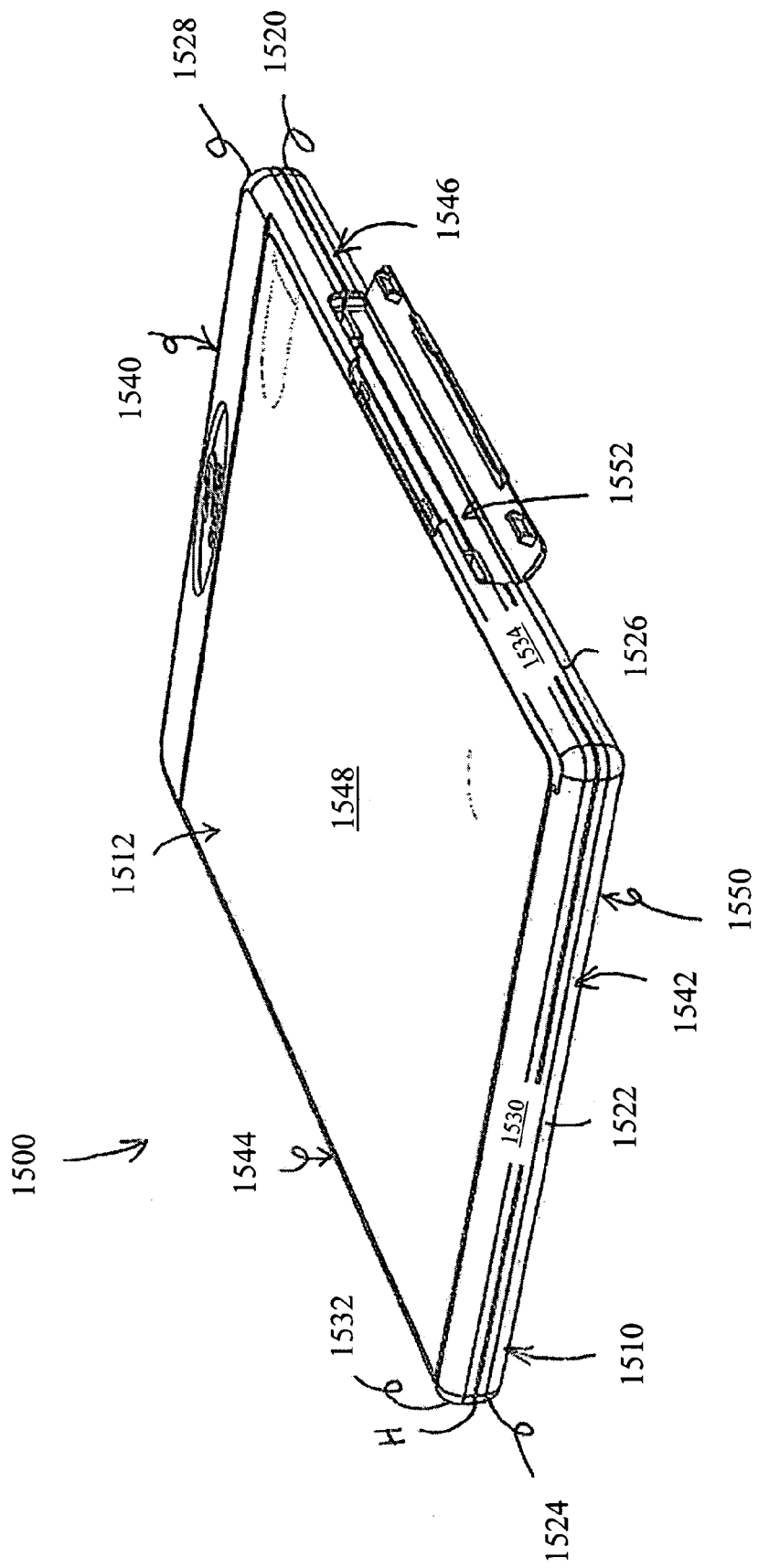
FIGS. 15-17 are perspective views of a further embodiment of a package including a security bar, the security bar being in an open position, according to the present invention.

Further in accordance with the invention, FIG. 15 illustrates an additional exemplary embodiment of a package 1500 that includes a base portion 1510 and a cover portion 1512. The base portion 1510 and the cover portion 1512 are adapted to mate when the package 1500 is in the closed position, as shown in FIG. 15. More specifically, the base portion 1510 includes top end 1520, bottom end 1522, first side end 1524, and second side end 1526 which are adapted to mate with top end 1528, bottom end 1530, first side end 1532, and second side end 1534 associated with cover portion 1512. Further, the first side end 1524 is connected to the first side end 1532 by a living hinge H. The corresponding ends of the base portion 1510 and the cover portion 1512 form the composite walls of the package 1500 when the package 1500 is in the closed position. More specifically, the top ends 1520, 1528 form a top wall 1540, the bottom ends 1522, 1530 form a bottom wall 1542, the first side ends 1524, 1532 form a first side wall, and the second side ends 1526, 1534 form a second side wall 1546. Further, the cover portion 1512 includes front wall 1548 of the package 1500 and the base portion 1510 includes rear wall 1550 of the package 1500.

Figure 16:
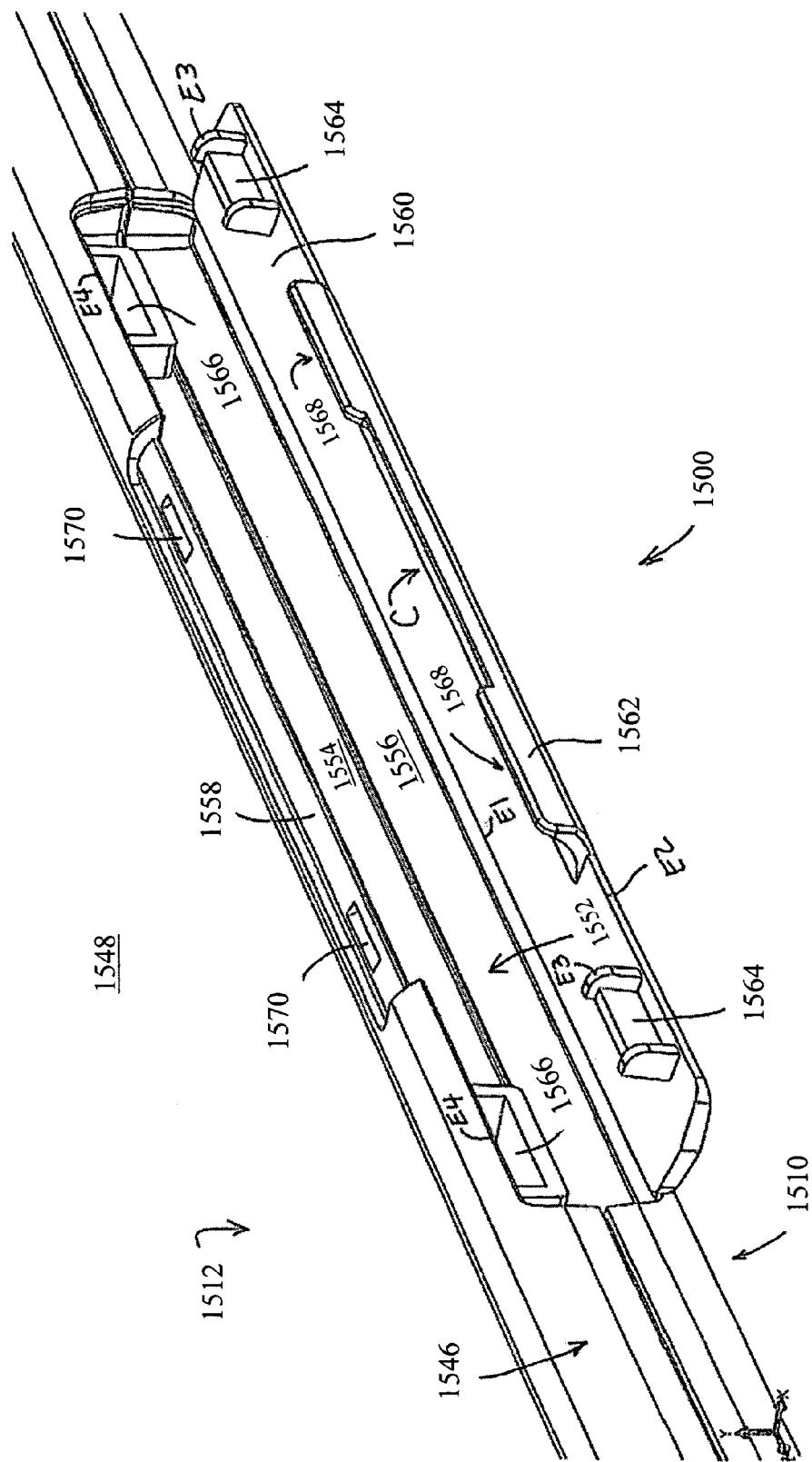

The second side wall 1546 and front wall 1548 include portions of a finger recess 1552, as best shown in FIG. 16. The finger recess 1552 defines upper and lower back walls 1554, 1556 that are offset from second side wall 1546, and defines front edge wall 1558 that is offset from front wall 1548. The package 1500 includes elements of a locking mechanism that are used to secure the base portion 1510 to the cover portion 1512 when the package 1500 is in the closed position. A locking or security bar 1560 is hingedly connected to base portion 1510 such that the security bar 1560 can be pivotally rotated to be received in the finger recess 1552 or otherwise fill or at least partially cover the finger recess 1552. More specifically, a first end E1 of the security bar 1560 is hingedly connected to base portion 1510 along a lower edge of the finger recess 1552. The illustrated locking or "security" bar 1560 has a substantially L-shaped profile defined by a ledge or extension portion 1562 that is preferably, but not necessarily, centered along the length of the security bar 1560 and positioned adjacent to a second end E2 of the security bar 1560 that is opposite the first end E1. The extension portion 162 extends inwardly towards the finger recess 1552 in a direction that is substantially perpendicular to the primary portion of security bar 1560 and includes a cutout portion C that is substantially centered on the extension portion 1562.

Additional elements of the locking mechanism include locking elements that secure the base portion 1510 to the cover portion 1512 and snapping elements that secure the security bar 1560 over the finger recess 1552. In the exemplary embodiment of FIG. 15, the locking elements that secure the base portion 1510 to the cover portion 1512 include cantilevered projections 1564 that are disposed on the inside surface of the security bar 1560 and the slots 1566 that are disposed in or adjacent to the upper back wall 1554 in the finger recess 1552. The snapping elements that secure the security bar 1560 in the finger recess 1552 include detents 1568 (best shown in FIG. 17) that are disposed on the bottom surface of extension portion 1562 and include depressions 1570 that are disposed in front edge wall 1558.

Figure 17:
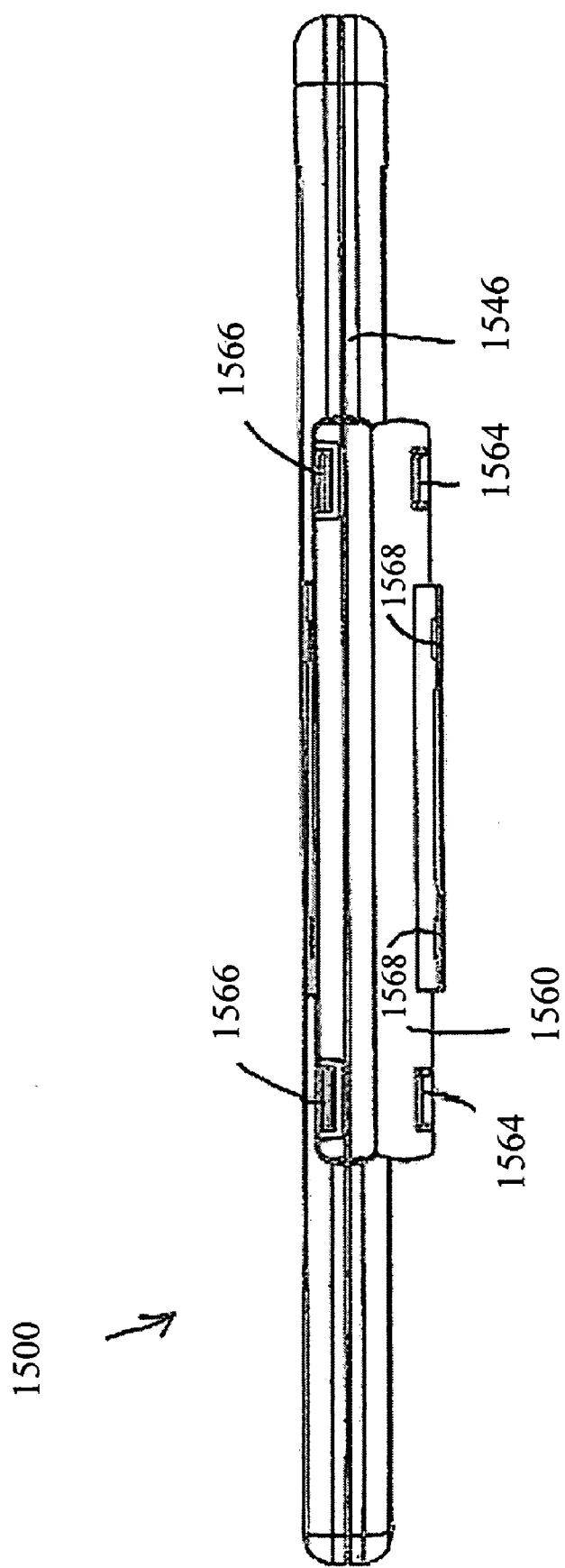
Figure 18:
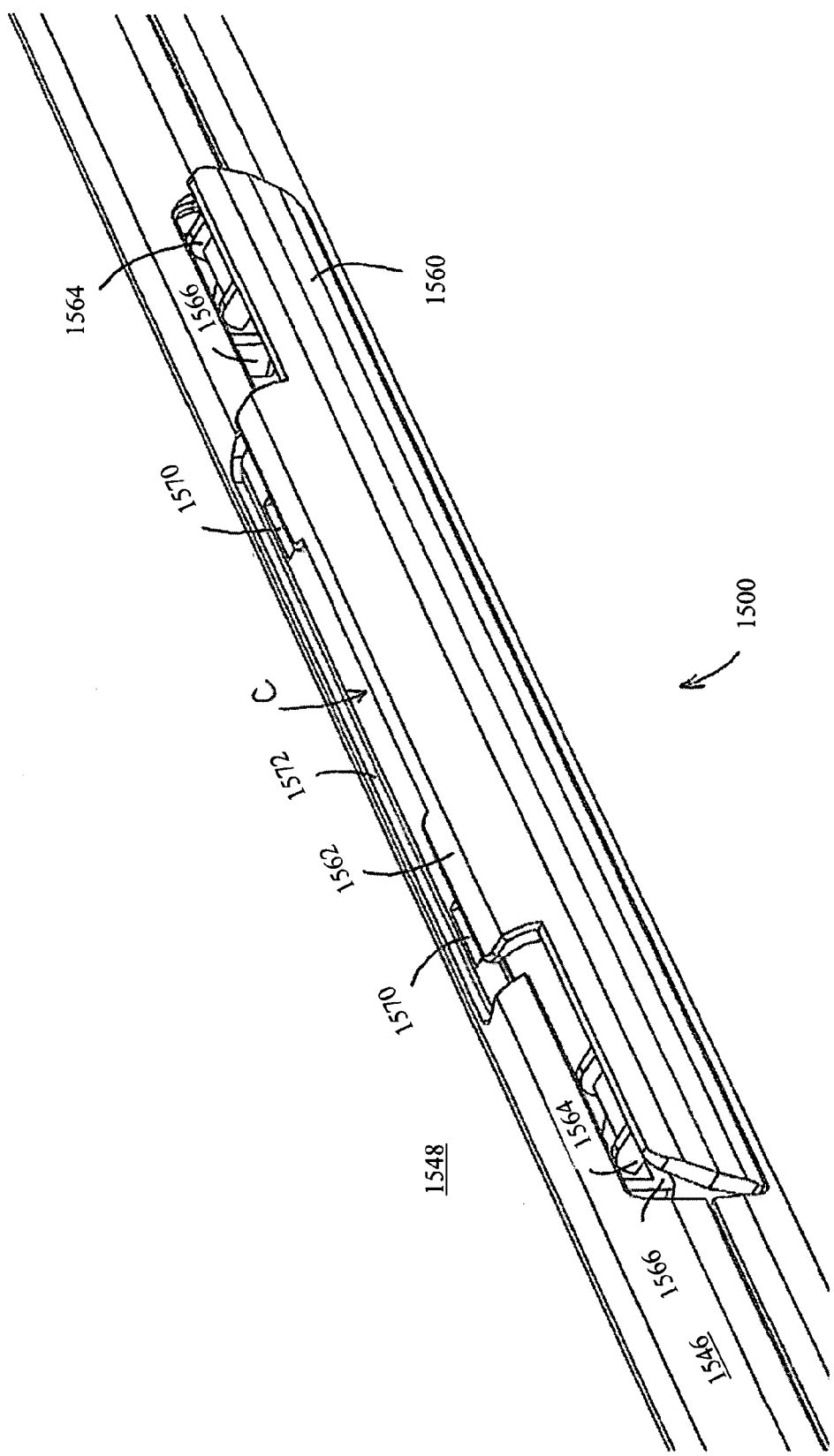
FIG. 18 is a perspective view of the package of FIG. 15, the security bar being in a partially closed position.
Figure 19:
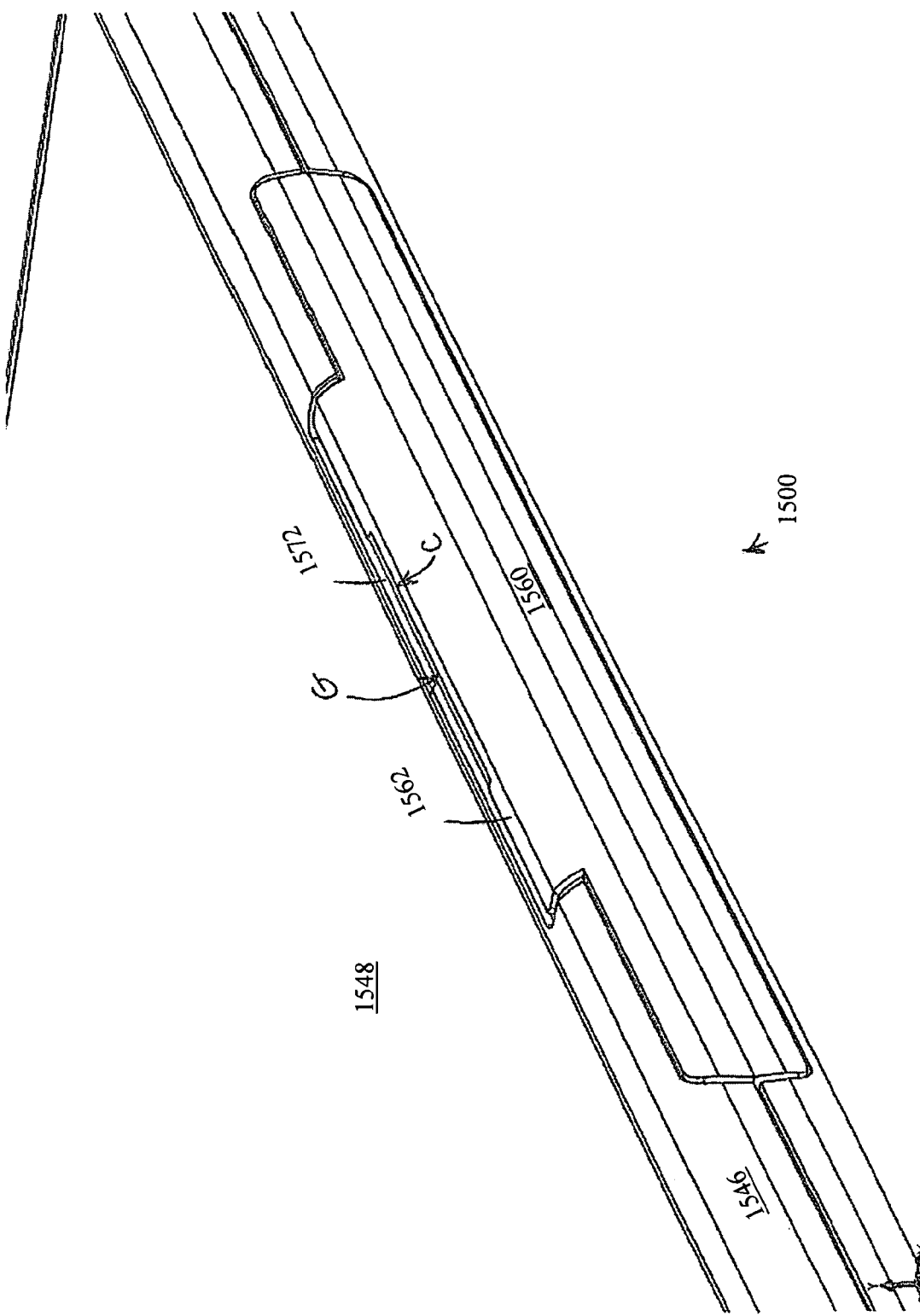
FIGS. 19-20 are perspective and top views, respectively, of the package of FIG. 15, the security bar being in a fully closed position.
Figure 20:
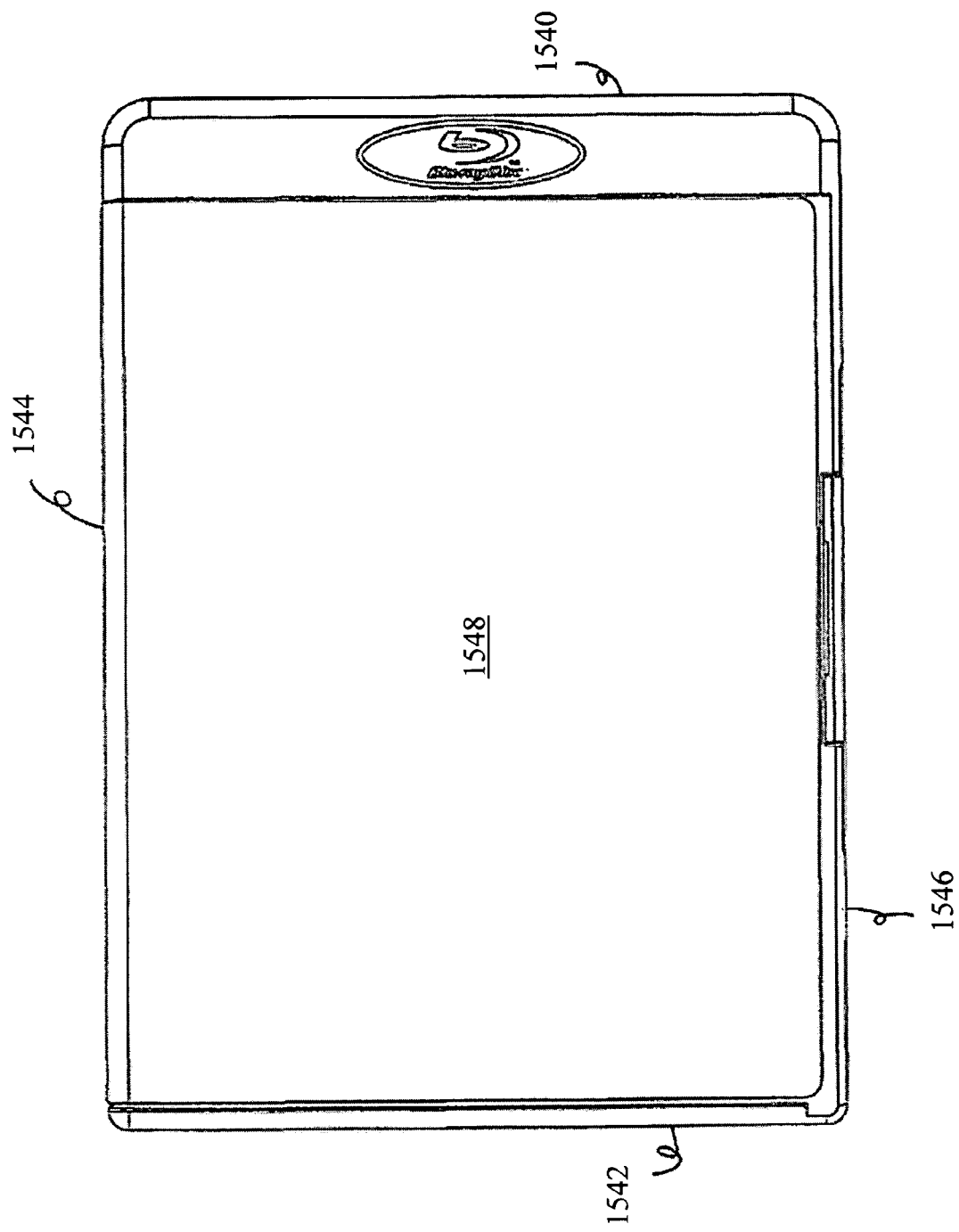

A non-limiting method of engaging and releasing the locking mechanism of the package 1500 will now be described. Beginning with the package 1500 in the closed position and the security bar 1560 in a fully open position as shown in FIGS. 15-17, the security bar 1560 is rotated toward the finger recess 1552 as shown in FIG. 18. The cantilevered projections 1564 on the inner surface of the security bar 1560 align with respective slots 1566 such that as the security bar 1560 is rotated to be received in recess 1552, the cantilevered projections 1564 are received in respective slots 1566 and the cover portion 1512 is thereby secured to the base portion 1510. As shown in FIG. 16, the edges E3 of the cantilevered portions 1564 are rounded such that the edge E4 of the slot 166 does not obstruct the cantilevered portion 1564 as the security bar 1560 is rotated into the finger recess 1552. As shown in FIGS. 19-20, the security bar 1560 is substantially fully received in the finger recess 1552 such that the bottom surface of extension portion 1562 is in a face contacting relationship with or otherwise adjacent to the front edge wall 1558. As the security bar 1560 is fully received, the detents 1568 and the depressions 1570 are aligned and designed such that the detents 1568 engage respective depressions 1570 to hold the locking arm 1560 in the fully received and closed position. In the closed position, the cutout portion C and inner wall 1572 (as shown in FIG. 19) define a groove G.

A user may access the contents of the closed and locked package 1500 by first engaging the groove G and applying a force to rotate the security bar 1560 from the finger recess 1552. As the user applies such a force the detents 1568 are disengaged from the depressions 1570 and the security bar 1560 partially rotates from the finger recess 1552. As the security bar 1560 is partially rotated from the finger recess 1552, the cantilevered protrusions 1564 remain at least partially engaged in respective slots 1566 such that the base portion 1510 is not separable from the cover portion 1512. As the security bar 1560 is fully rotated from the finger recess 1552, the protrusions are pulled from respective slots 1566 and the finger recess 1552 is accessible. A user may then access the contents of the package 1500 by engaging the finger recess 1552 and applying opposing forces to the base 1510 and the cover 1512 such that the base 1510 and cover 1512 rotatably separate about the living hinge H.

In alternative embodiments, the elements of the locking mechanism may be altered without departing from the scope of the invention. For example, the cantilevered protrusions 1564 in the exemplary embodiment have a substantially I-shaped cross section that, in alternative embodiments, could be rectangular, L-shaped, C-shaped, T-shaped, or the like. In alternative embodiments, the slots 1566 could be disposed in the upper back wall 1554 where the offset distance between the second side wall 1546 and the upper back wall 1554 is reduced. The size, number, and position of the cantilevered protrusions 1564 and respective slots 1566 are design choices that are within the scope of the invention. In further alternative embodiments, the position of the snapping elements may be reversed such that the detents 1568 are disposed on front edge wall 1558 and respective depressions 1570 are disposed on the bottom portion of the extension portion 1562. The size, number, and position of the detents 1568 and the depressions 1570 are also design choices that are within the scope of the invention. Additionally, any suitable means for receiving a detent 1568 may be used including, but not limited to, apertures. One advantage of the aforementioned locking mechanism is that as the security bar 1560 is rotated toward the finger recess 1552 the package 1500 is secured by the locking elements before the security bar 1560 is engaged by the snapping elements. Similarly, as the security bar 1560 is rotated away from the finger recess 1552, the package 1500 is secured by the locking elements even after the security bar 1560 has been disengaged from the snapping elements. This advantage may be used to deter theft of the contents of a package 1500 in that, since the security bar 1560 must be fully opened, the locking mechanism provides an obvious indication of a package 1500 being accessed or tampered with. In addition, the locking mechanism may be used with additional anti-theft functions. For example, an alarm device may be implemented in the package 1500 that is triggered by the separation of the cantilevered projections 1564 from the slots 1566.

Figure 21:
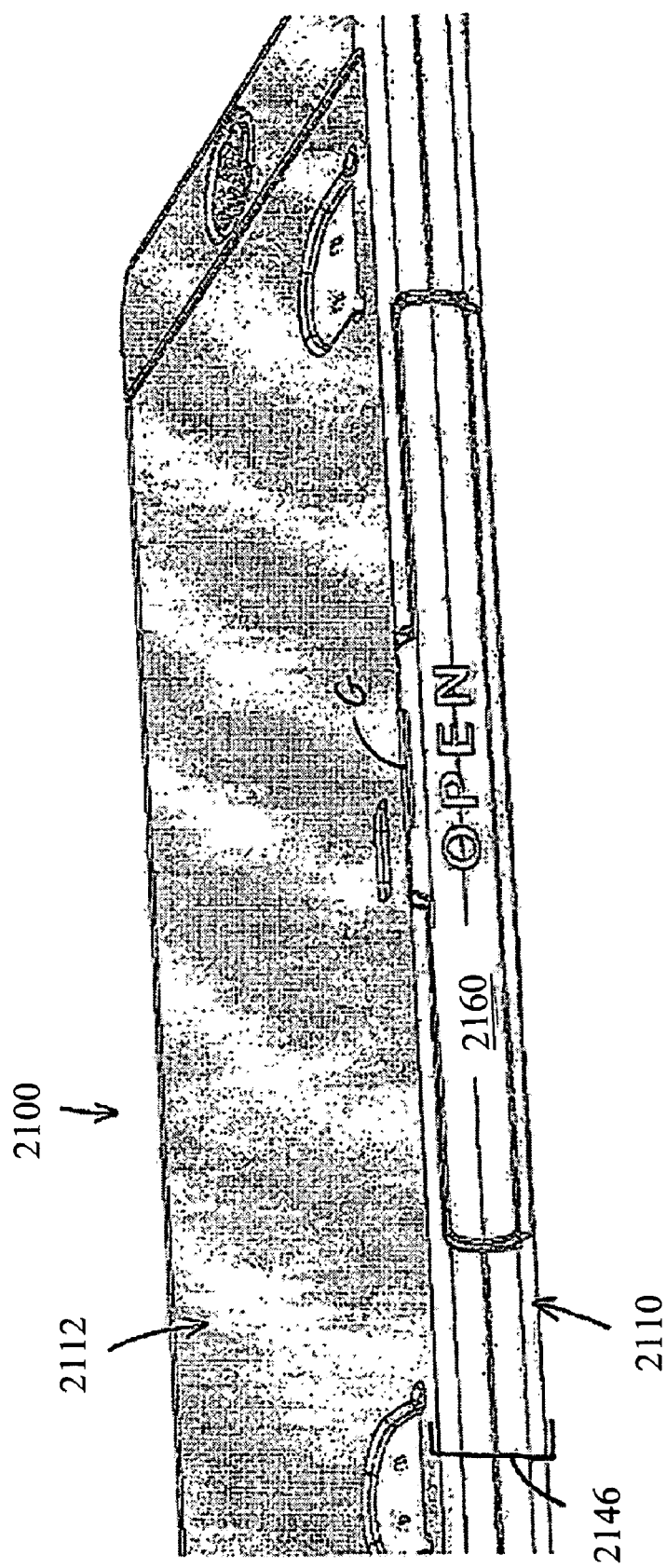
FIGS. 21-23 are perspective views of a further alternative embodiment of a package including a security bar.
Figure 22:
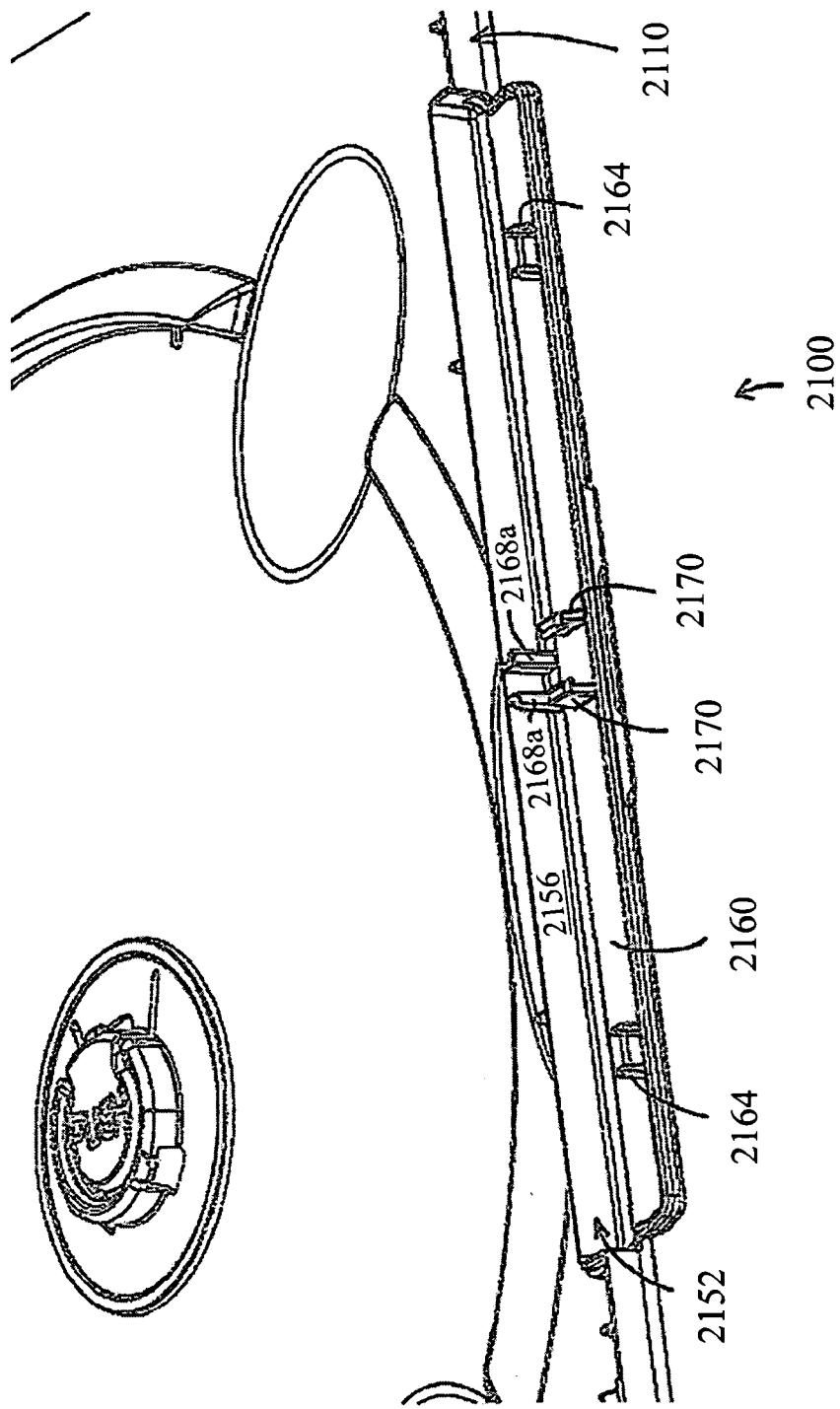
Figure 23:
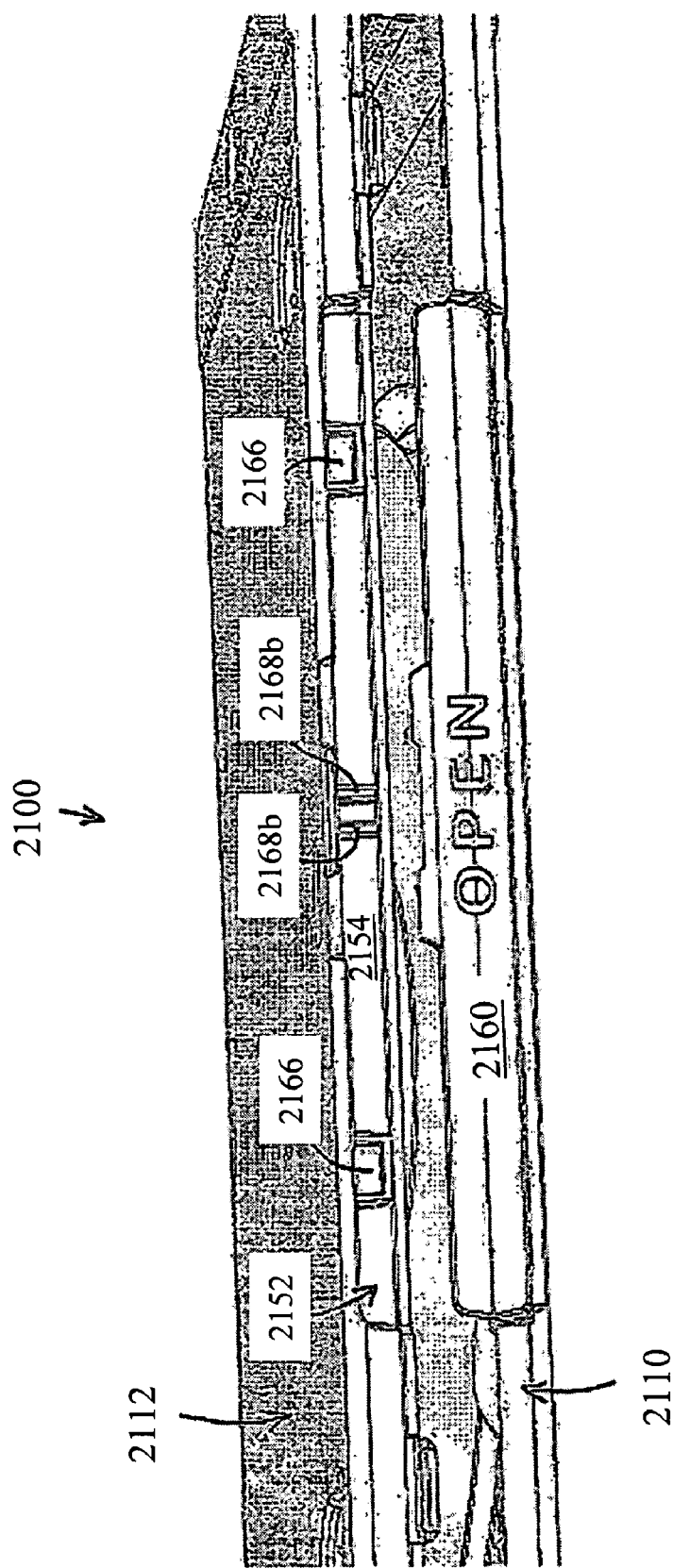

As shown in FIGS. 21-23, a further alternative embodiment of a case or package 2100 includes a base portion 2110 and a cover portion 2112. The base portion 2110 and the cover portion 2112 are adapted to mate when the package 200 is in the closed position, as shown in FIG. 21. Further, the base portion 2110 is connected to the cover portion 2112 by a living hinge (not shown). The corresponding ends of the base portion 2110 and the cover portion 2112 form the composite walls of the package 2100, when the package 2100 is in the closed position. Moreover, an end of the base portion 2110 and a corresponding end of the cover portion 2112 form a side wall 2146.

The side wall 2146 includes portions of a finger recess 2152, as best shown in FIGS. 22 and 23. The finger recess 2152 is defined in the side wall 2146 and includes upper and lower back walls 2154, 2156. The package 2100 includes elements of a locking mechanism that are used to secure the base portion 2110 to the cover portion 2112 when the package 2100 is in the closed position. A security bar 2160 is hingedly connected to base portion 2110 such that the security bar 2160 can be pivotally rotated to be received in the finger recess 2152, or otherwise fill or at least partially cover the finger recess 2152.

Additional elements of the locking mechanism include locking elements that secure the base portion 2110 to the cover portion 2112 and snapping elements that secure the security bar 2160 over the finger recess 2152. In the exemplary embodiment, the locking elements that secure the base portion 2110 to the cover portion 2112 include cantilevered projections 2164 that are disposed on the inside surface of the security bar 2160 and the slots 2166 that are disposed in, or adjacent to, the upper back wall 2154 in the finger recess 2152.

The snapping elements that secure the security bar 2160 in the finger recess 2152 include receiving elements 2168a (best shown in FIG. 22), 268b (best shown in FIG. 23) and engaging elements 2170 (best shown in FIG. 22). The receiving elements 2168a are disposed adjacent to the lower back wall 2156, the receiving elements 2168b are disposed adjacent to the upper back wall 2154, and the engaging elements 2170 are disposed on the inside surface of the security bar 2160.

The receiving elements 2168a, 2168b are designed and positioned to be engaged by the engaging elements 2170 when the package 2100, and the security bar 2160, are both in closed positions. The receiving elements 2168a, 2168b align with one another when the package 2100 is in the closed position. In alternative embodiments, the security bars 2168a, 2168b and the security bars 2170 may be designed to engage one another using any known method including, but not limited to, a detent-depression configuration and a latch configuration. In alternative embodiments, the receiving elements 2168a, 2168b and engaging elements 2170 are aligned, but located at different positions within the finger recess 2152.

When the package 2100 is in the closed position, the security bar 2160 can be rotated toward the finger recess 2152 to lock the package 2100. As the security bar 2160 is rotated to be received in recess 2152, the cantilevered projections 2164 are received in respective slots 2166 and the cover portion 2112 is thereby secured to the base portion 2110. As the security bar 2160 is fully received, the engaging elements 2170 engage the receiving elements 2168a, 2168b to lock the locking arm 2160 in the fully received and closed position. The locking arm 2160 can be opened by applying a force in a groove G (shown in FIG. 21) to disengage the engaging elements 2170 from the receiving elements 2168a, 2168b.

It should be noted that an additional advantage of the snapping elements, which secure the security bar 2160 over the finger recess 2152, is that the security bar 2160 can be secured in a closed position when the package 2100 is in an open position, as shown in FIG. 23. The engaging elements 2170 can engage the receiving elements 2168a to hold the security bar 2160 in the portion of the finger recess 2152, as may be advantageous during loading of the contents.

Figure 24:
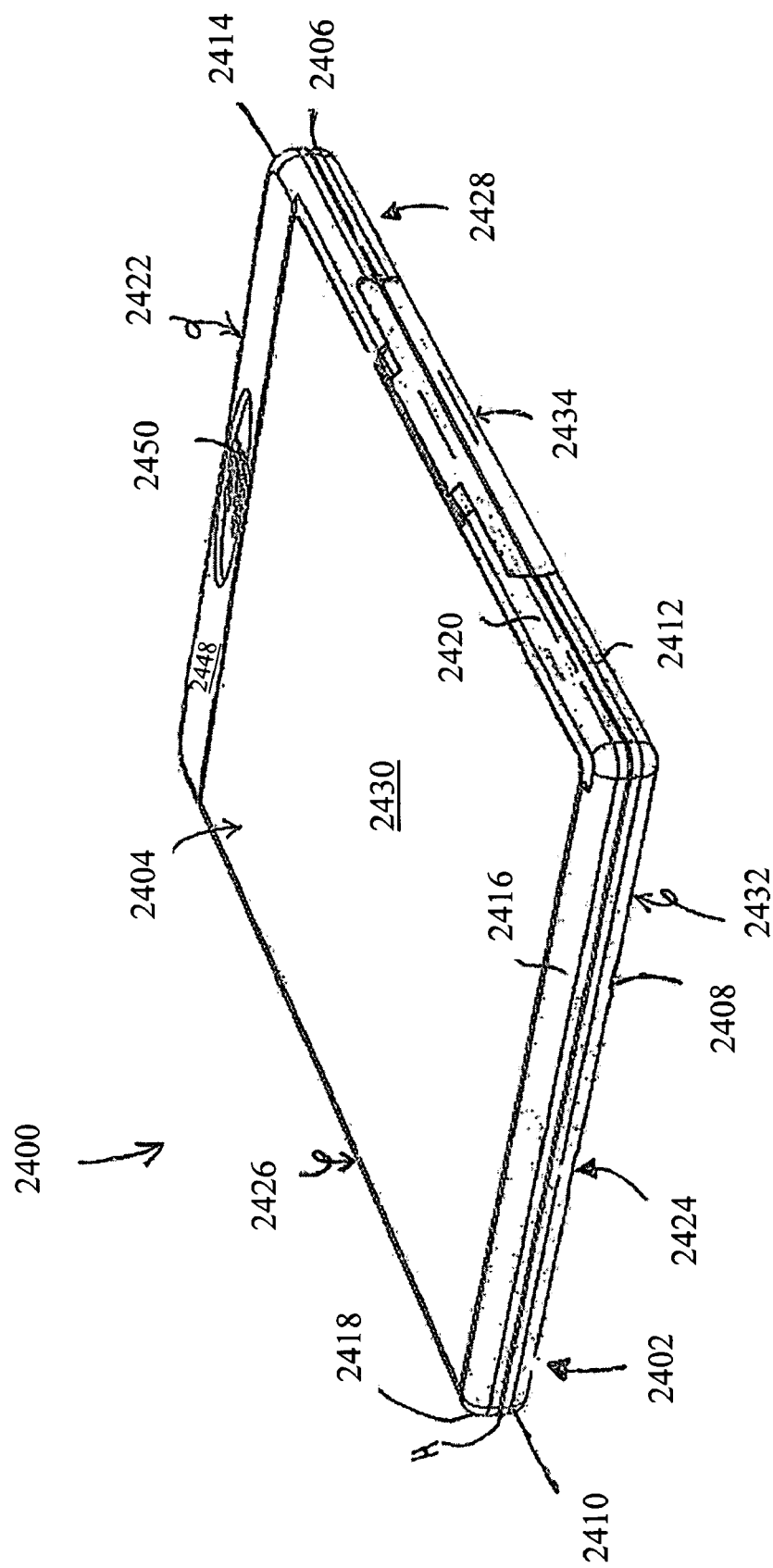
FIGS. 24-28 are perspective views of a package according to the present invention having tamper-resistant ribs formed therein.

FIG. 24 illustrates a further exemplary embodiment of a package, particularly a case 2400. The material used to manufacture the case 2400 can be any material known to those skilled in the art. In testing, Applicants utilized a thin thermoplastic polymer, polypropylene. This material is inexpensive, resistant to fatigue, and lightweight. However, in order to sustain a functional case with these properties, the inventor added features to increase rigidity, aid in proper closure of the case 2400, provide additional security, reduce cosmetic damage during fulfillment, and eliminate unwanted particulates from entering the case 2400.

The case 2400 includes a base portion 2402 and a cover portion 2404. The base portion 2402 and the cover portion 2404 are adapted to mate when the case 2400 is in the closed position, as shown in FIG. 24. More specifically, the base portion 2402 includes a base top end 2406, a base bottom end 2408, a base first side end 2410, and a base second side end 2412, which are adapted to mate with the cover portion 2404 comprising a cover top end 2414, a cover bottom end 2416, a cover first side end 2418, and a cover second side end 2420.

Further, the base first side end 2410 is hingedly connected to the cover first side end 2418 by a living hinge H. The corresponding ends of the base portion 2402 and the cover portion 2404 form the composite walls of the case 2400 when the case is in the closed position. More specifically, the top ends 2406, 2414 form a composite top wall 2422, the bottom ends 2408, 2416 form a composite bottom wall 2424, the first side ends 2410, 2418 form a composite first side wall 2426, and the second side ends 2412, 2420 form a composite second side wall 2428. The cover portion 2404 includes a cover panel 2430 and the base portion 2402 includes a base panel 2432 of the case 2400. The cover portion 2404 further includes a recessed cover branding bar 2448, on which a logo 2450 is affixed. The recessed cover branding bar 2448 is described in detail with respect to FIG. 27. The case 2400 further includes a locking mechanism 2434.

Figure 25:
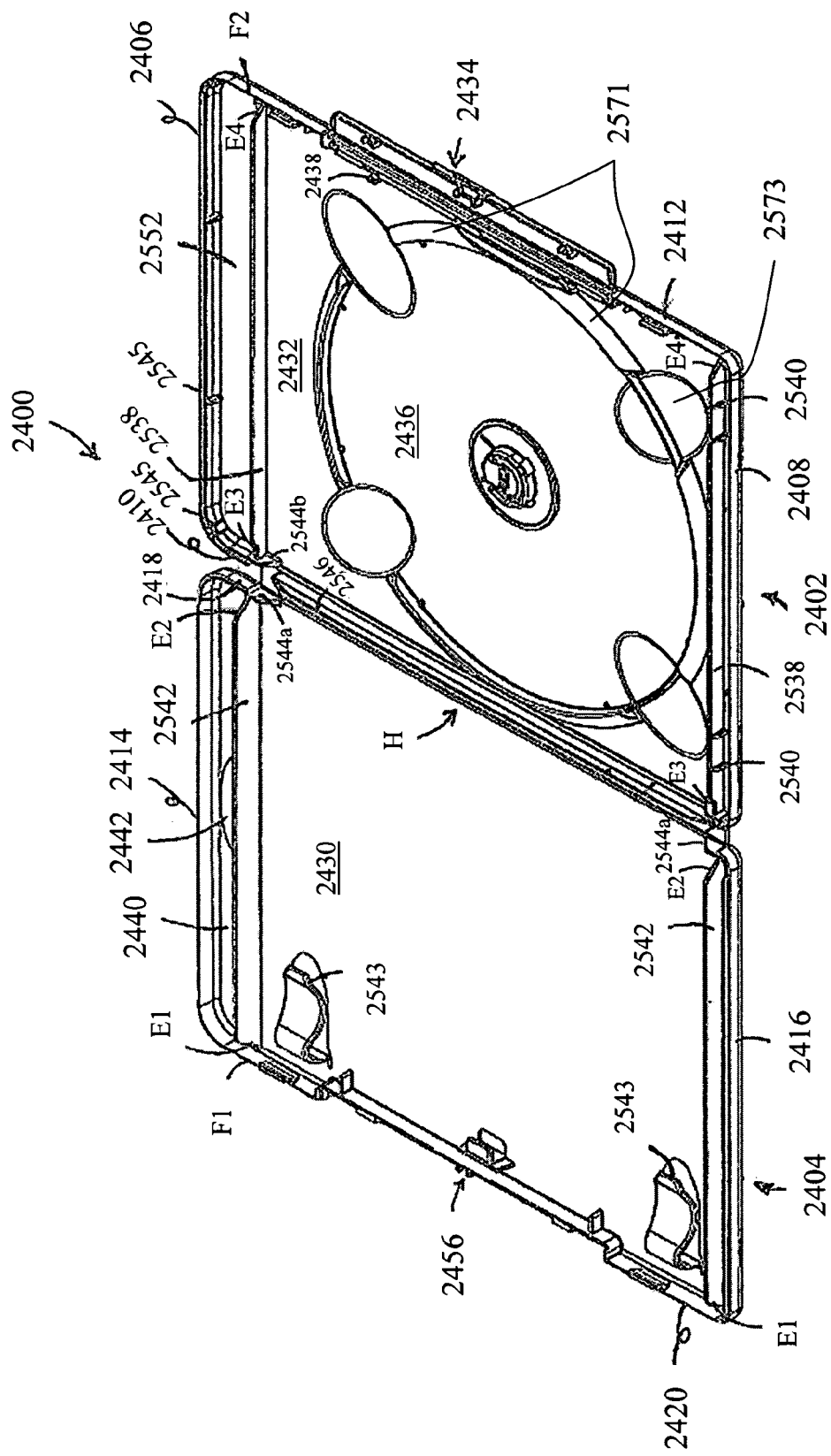

Referring now to FIG. 25, the case 2400 is shown in the open position. The inside of the base portion 2402 and the cover portion 2404 can be seen. The inner portion of the base panel 2432 includes a "nest" or recess 2536. The illustrated recess 2536 is designed to house a compact disc (CD), a digital video disc (DVD), Blu-ray disc, or like media, as is known to those skilled in the art. It is contemplated, however, that in alternative embodiments the recess 2536 can be designed to house any portable items such as, but not limited to, cigars, syringes, medicines, makeup, and the like. A base security rib 2538 is affixed to the base panel 2432 above the recess 2536 and proximate to a recessed base branding bar 2552. Another base security rib 2538 is affixed below the recess 2536. The base security ribs 2538 extend from the base first side end 2410 to the base second side end 2412. Further, the base security ribs 2538 are formed such that they are taller than the base edge F2 of the base top end 2406 and the base bottom end 2408. This decreases the likelihood of theft, for example, by prying open the composite top wall 2422 and/or the composite bottom wall 2424 to remove the disc.

Affixed to the inner portion of the cover panel 2430 are cover security ribs 2542. The cover security ribs 2542 function to increase the rigidity of the case 2400 and to properly align materials that are typically stored beneath clips 2543. The cover security ribs 2542 extend from the cover second side end 2420 to the cover first side end 2418. The edges E1 perpendicularly terminate at the cover second side end 2420 below the cover edge F1. The edges E2 perpendicularly terminate at the cover first side end 2418 even with the cover edge F1. Edges E1 and E2 aid in eliminating binding and misalignment between the cover portion 2404 and the base portion 2402 when the case 2400 is being closed. The extended cover security ribs 2542 and the tapered edges E1 and E2 also function to eliminate an audible click that was present prior to adding these features, particularly when the cover portion 2404 and the base portion 2402 were misaligned.

Further, in the illustrated embodiment, the cover security ribs 2542 are positioned so as to be offset to the base security ribs 2538. When the case 2400 is in the closed position, this offset positions the cover security ribs 2542 in contact with tapered alignment ribs 2540, which are affixed to the base security ribs 2538. The illustrated alignment ribs 2540 are positioned on the outer side of the base security ribs 2538; that is, facing the top end 2406 and bottom end 2408, respectively and the cover security ribs 2542 are positioned to interface with the alignment ribs 2540 when the case 2400 is closed. It is contemplated, however, that the alignment ribs 2540 can be positioned on the inner face of the base security ribs 2538, as such the cover security ribs 2542 can be positioned offset towards the interior of case 2400. The alignment ribs 2540 guide the cover security ribs 2542 into the closed position, thus providing further aid in eliminating binding and misalignment between the cover portion 2404 and the base portion 2402. Additional advantages of the alignment ribs 2540 include reducing clearance between the security ribs and providing more accurate alignment while closing.

It is contemplated that the alignment ribs 2540 can be any size, shape, and positioned in any way such as to achieve a substantially similar result when closing case 2400. The alignment ribs 2540 also function to increase the rigidity of the base security ribs 2538 and consequently the overall rigidity of case 2400. In alternative embodiments the alignment ribs 2540 are positioned adjacent the cover security ribs 2542 so as to interface with the alignment ribs 2538 when the case 2400 is closed.

The locking mechanism 2434 attaches to cover receiving elements 2436 to secure the base portion 2402 to the cover portion 2404. The locking mechanism 2434 attaches to base receiving elements 2438 so as to stow the locking mechanism 2434 in a passive position.

Stop ribs 2544*a*, 2544*b* are affixed to both the cover and base panels 2430, 2432, respectively, so as to be perpendicular to the security ribs 2538, 2542 and align longitudinally with first side ends 2410, 2418. The stop ribs 2544*a*, 2544*b* increase overall rigidity of the case 2400. Further, when case 2400 is in the closed position, the stop ribs 2544*a*, 2544*b* are positioned in a face-contacting relationship with living hinge. This prevents dust and other particulates from entering the case 2400.

During fulfillment, the cover portion 2404 is typically rotated towards the base portion 2402 to close the case 2400. Without the stop ribs 2544*a*, 2544*b* the living hinge H typically rotates to an angle approximately greater than ninety-degrees, a condition that caused the cover edge F1 to extend beyond the base edge F2, thus making proper alignment difficult and automated closing problematic. The stop ribs 2544*a*, 2544*b* prevent the living hinge H from being rotated to an angle approximately greater than ninety-degrees, thus preventing binding and misalignment of the cover and base edges F1 and F2, respectively.

Figure 26:
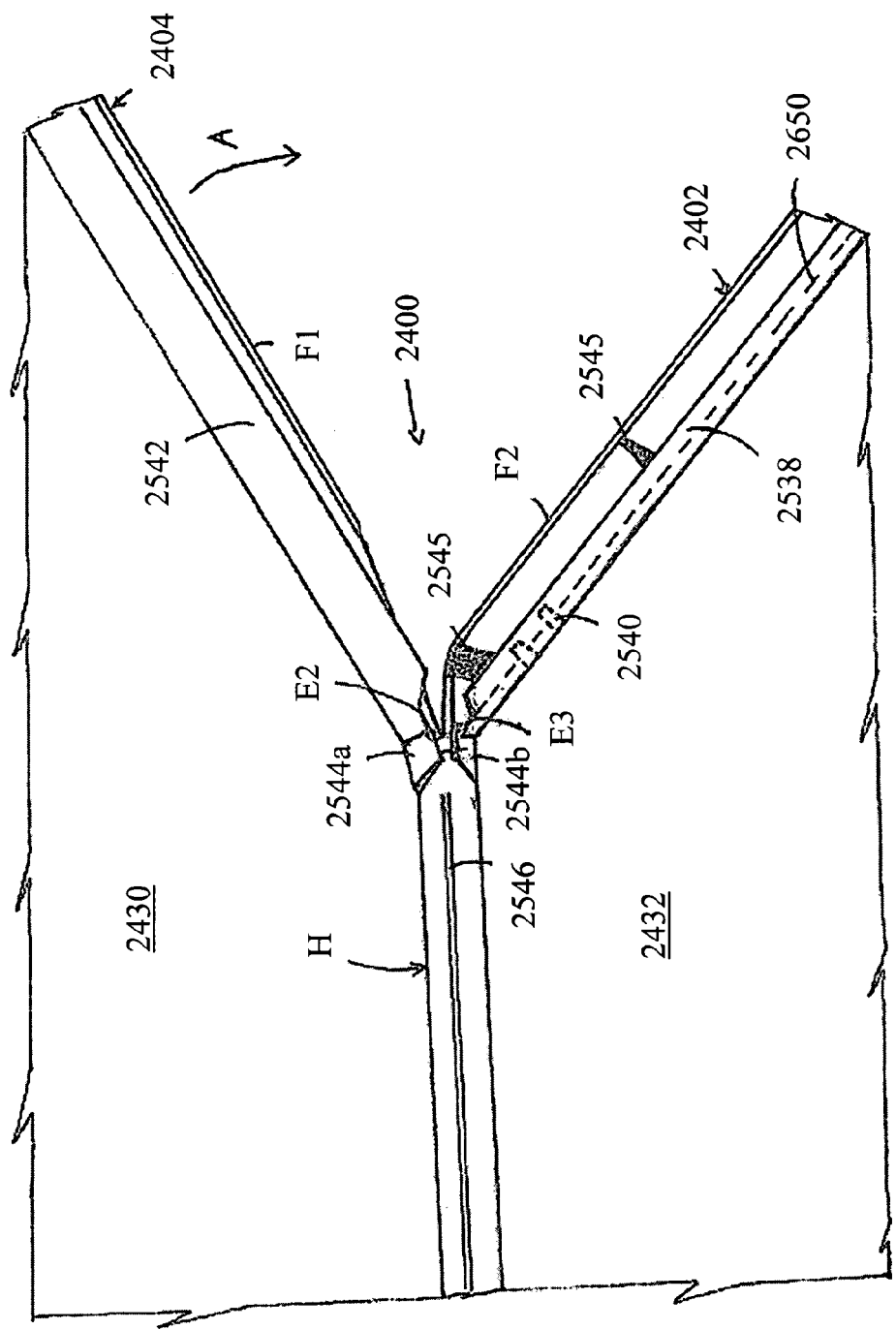

The position of the stop ribs 2544*a*, 2544*b* during closure is best shown in FIG. 26. As shown, the cover portion 2404 is being rotated towards the base portion 2402 in direction A. The stop rib 2544*a* is positioned in a face-contacting relationship with living hinge H and as such prevents the living hinge H from being rotated to an angle approximately greater than ninety-degrees, thus preventing the cover edge F1 from being misaligned with the base edge F2. In alternative embodiments, the stop rib 2544*b* is positioned in a face-contacting relationship with living hinge H and as such prevents the living hinge H from being rotated to an angle approximately greater than ninety-degrees, thus preventing the cover edge F1 from being misaligned with the base edge F2. To further aid in preventing binding and misalignment, the height and thickness of the spine rib 2546 is increased.

In further alternative embodiments, the recessed base branding bar 2552 (not shown) forms a trough 350 that provides a receiving channel for the base security rib 2538.

Figure 27:
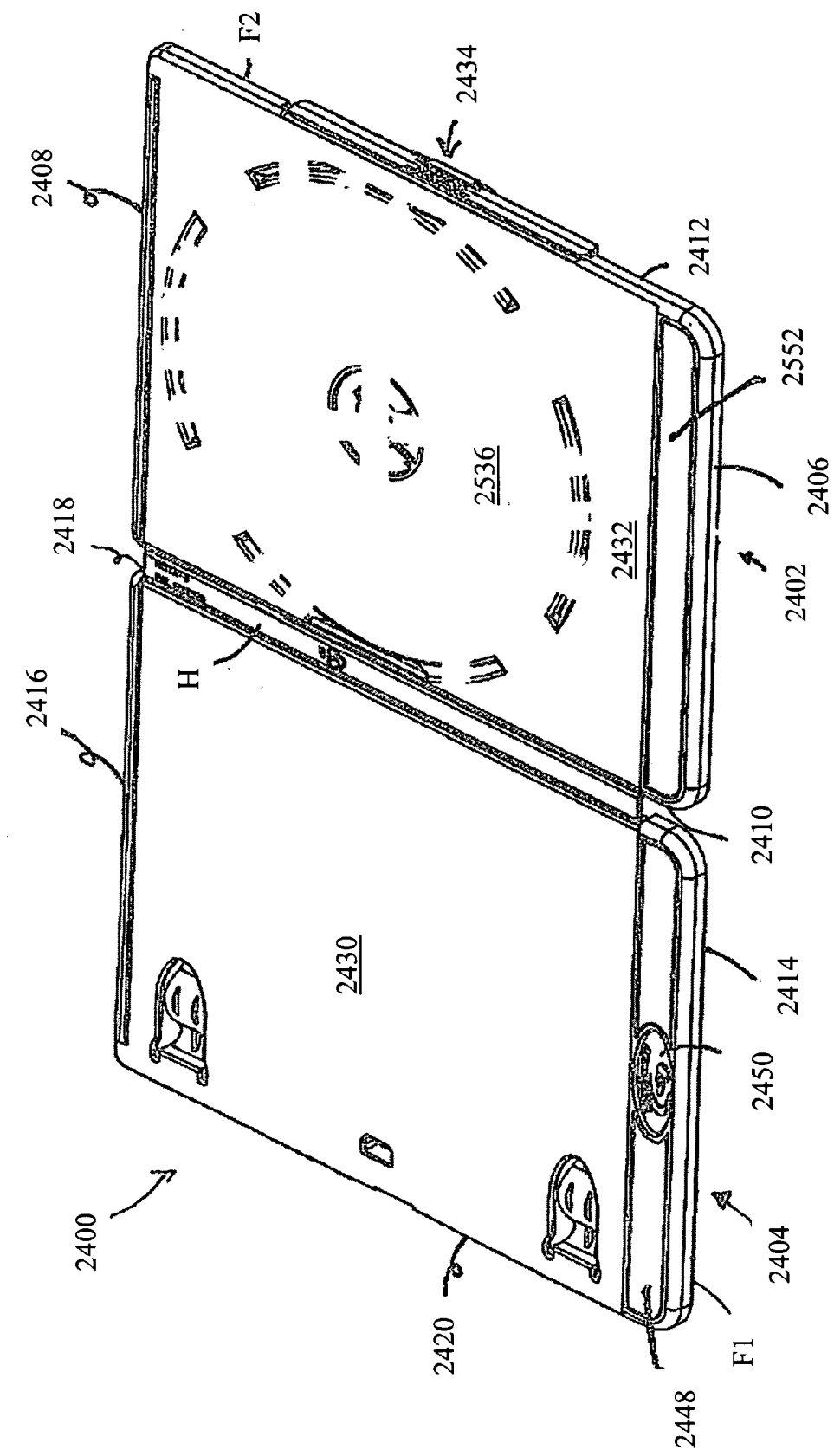

Referring now to FIG. 27, a transparent perspective view of the back of the case 2400 and the recessed cover and base branding bars 2448, 2552, respectively, are shown. The cover branding bar 2448 is recessed with respect to the cover panel 2430. Likewise, the base branding bar 2552 is recessed with respect to the base panel 2432. The cover branding bar 2448 includes a logo 2450. The recessed position of the cover branding bar 2448 protects the logo 2450 from cosmetic damage. For example, when multiple closed cases 2400 are positioned in a panel-contacting relationship, the recessed cover branding bar 2448 of one case and the recessed base branding bar 2552 of another case align so as to prevent cosmetic damage to the logo 2450.

Many of the previously described features increase the torsional rigidity of various portions of the case 2400. The overall rigidity of the case 2400 is further increases by the addition of supports 2545, as best shown in FIG. 25 and FIG. 26.

Figure 28:
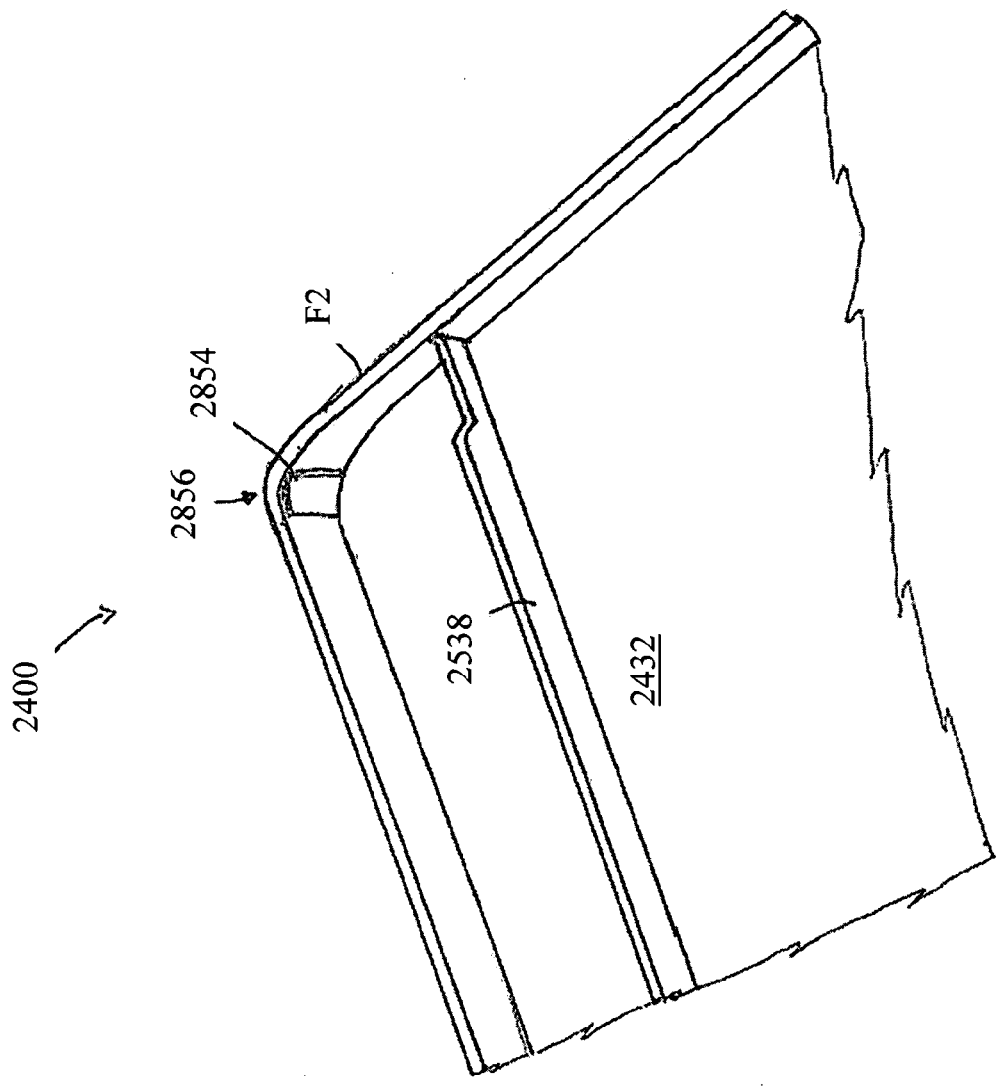

Referring now to FIG. 28, there is shown the outer top of case 2400. The interior of the outer top corner includes an interlock 2854. The interlock 2854 increases corner rigidity of the case 2400, thus allowing for a thinner, lighter material to be used. The interlock 2854 includes a lip that creates a receiving channel 2856 between the interlock 2854 and the base edge F2. When the case 2400 is in the closed position, the cover edge F1 and the base edge F2 are held in face-contacting position by the receiving channel 2856.

Referring again to FIGS. 24-28 which illustrate a package 2400 for holding compact discs and the like, the package 2400 includes four arcuate rib structures 2571 (FIG. 25) formed on the surface of base panel 2432, which itself can be a separate insert tray in alternative embodiments. The rib structures 2571 are configured and adapted to visually emulate the design elements of the finger wells at region 2573, but are not, per se, finger wells. The ribs 2571 are positioned to support the a disc held in the recess 2536 during drop tests, shipping and handling, thus protecting the rosette 2575 from experiencing the full load of impact. The outer edge of the disc with exception of the four locations of corresponding ribs 2571 is fully accessible, in comparison with a container having only finger wells to enable grasping of a disc.

The complexity of design of the base panel 2432 is minimized, but as mentioned, the base panel 2432 still includes a visual element (e.g., the impression of finger wells at region 2573) that a consumer may expect to see in a package for holding media discs. The aforementioned configuration also creates minimal visual interruption of graphics that may be viewed through the surface of the base panel 2432. The aforementioned configuration also allows for better support of the outer cover material—e.g. a printed booklet, because both the cover and base are essentially flat, uninterrupted surfaces (with exception to the center rosette 2575).

However, with respect to disc packages that have a hinged multi-panel outer cover, a molded base panel 2432 and a molded cover 2430, the alignment rib 2540 details that are formed in the cover and base are particularly advantageous. Such alignment features allow for the cover 2430 and base to be hinged from an open to a closed position without the cover 2430 and base 2432 binding with one another.

Figure 29:
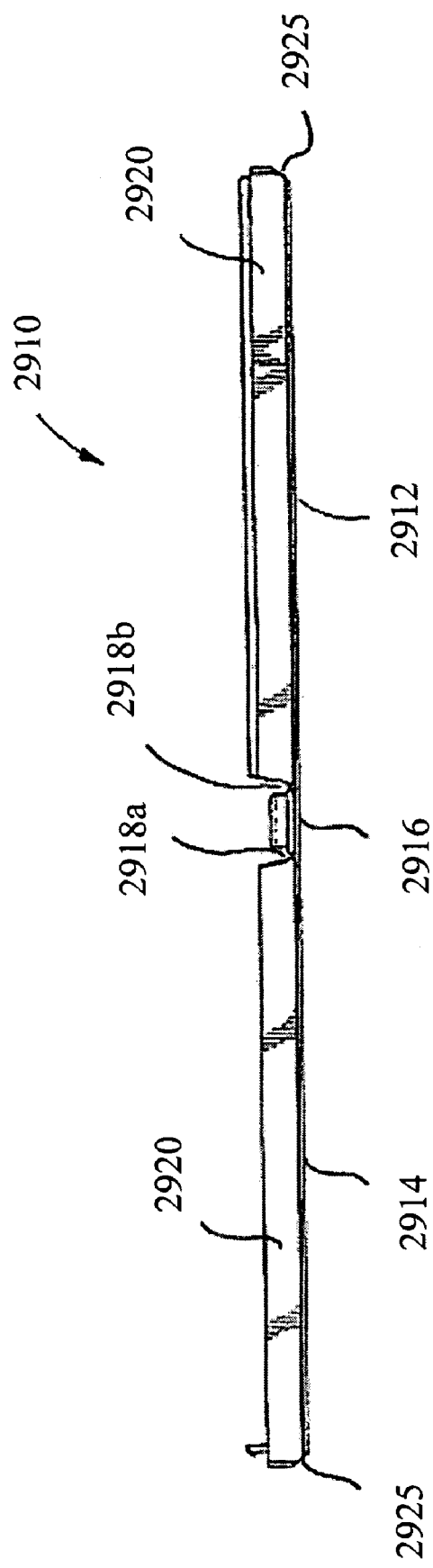
FIG. 29 is a side view of a prior art compact disc package arranged in the open position.
Figure 30:
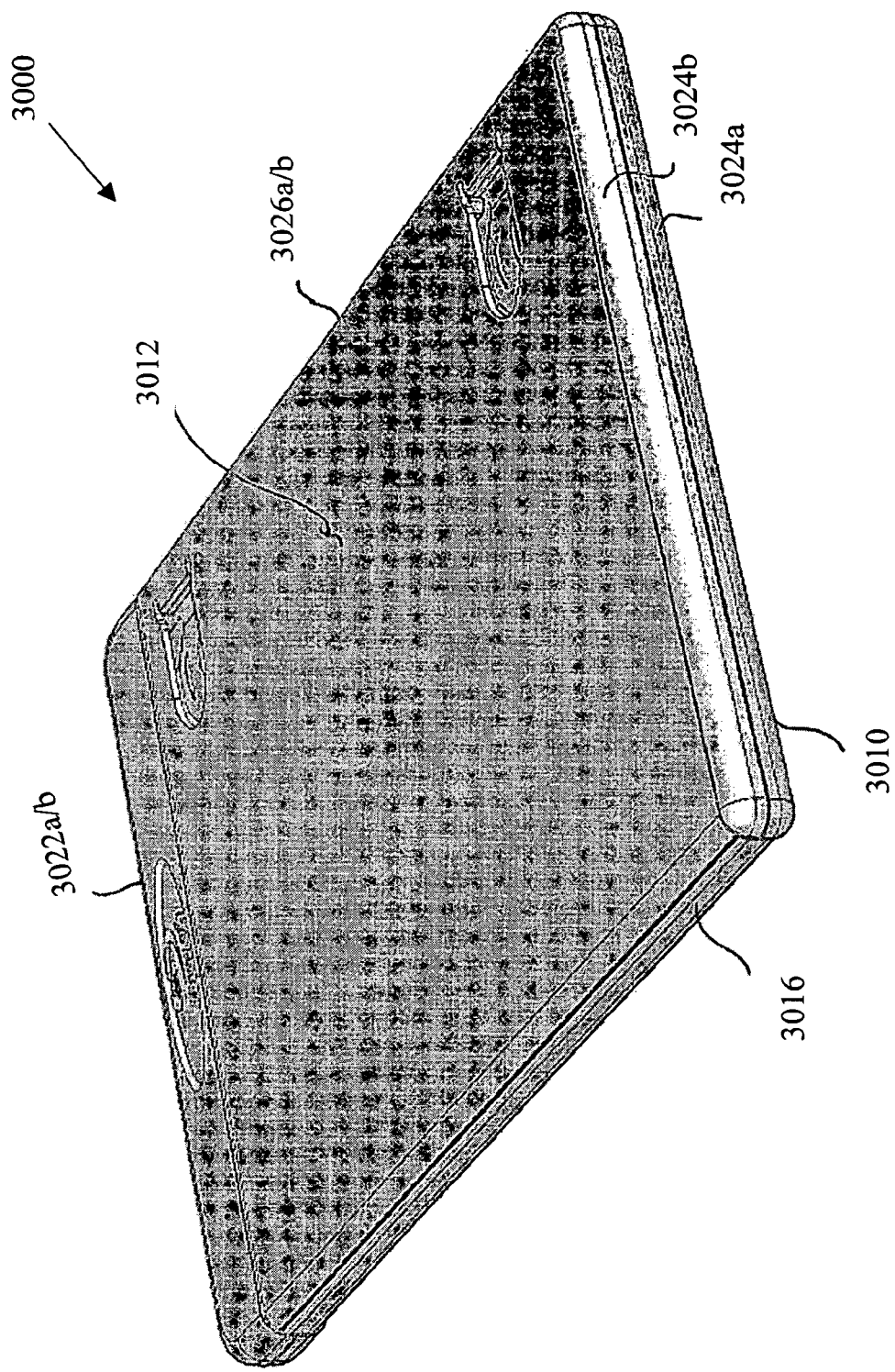
FIG. 30 is a perspective view directed at the cover of a further embodiment of a package constructed in accordance with the invention.

FIG. 29 is a side view of a package 2900 in accordance with the prior art, which is provided herein to serve as a comparison with the package embodiment of FIGS. 30-34. The package 2900, which is particularly suited to containing recorded media, such as CDs or DVDs, includes a back or base portion 2912, a front or cover portion 2914 and a spine section 2916. The base portion 2912 and the cover portion 2914 are attached to the spine section 2916 using two living hinges 2918*a*, 2918*b*.

In conventional CD packages or jewel boxes, such as that shown in FIG. 29, when the package 2910 is in the open position the spine section 16 is positioned in the same plane as the base portion 2912 and the cover portion 2914. This is done so that the pocket that is formed by welding plastic film to the package 2910 can accept a printed slip sheet of a similar dimension to the open package. Normally the spine side wall and spine section of the printed graphic slip sheet are close in dimension. Additionally, the slip sheet length closely matches the linear distance of the un-sealed length of the film. This feature helps prevent the graphics from shifting when the package is opened and closed.

The base and cover portions 2912, 2914 each include three side walls 2920 which project from common edge radiuses 2925 associate with the edge of the base and cover portions 2912, 1294. When package 2900 is in the closed position (not shown), there exists slightly radiused transitions between the base and cover portions, 2912 and 2914 respectively, and the spine section 2916. These radiuses result from the inwardly formed and bending living hinges 2918b. The slightly radius transition that join the base and the cover portions 2912, 2914 to the spine section 2916 do not closely match the common edge radiuses 2925 of the package 2900 and therefore, package 2900 has three ends with a rounded profile and a forth end with substantially straight profile.

Consequently, a disadvantage associated with the conventional package design illustrated in FIG. 29 is that the configuration of its spine 2916 and the living hinges 2918a, 2918b will not allow the end of the package 2916 defined by the spine and hinges to be curved or rounded in a similar fashion to the other three ends of the CD package. As a result, the end of the package 2900 defined by the spine 2916 and hinges 2918a, 2918b has a different profile than other three ends.

Referring now to FIGS. 30-34, there is illustrated a compact disc package constructed in accordance with one embodiment of the present invention and identified generally by reference numeral 3000. The compact disc package 3000 includes a living hinge configuration that allows the spine of the package to be curved or rounded so that all four ends of the package can have the same curved profile.

Figure 31:
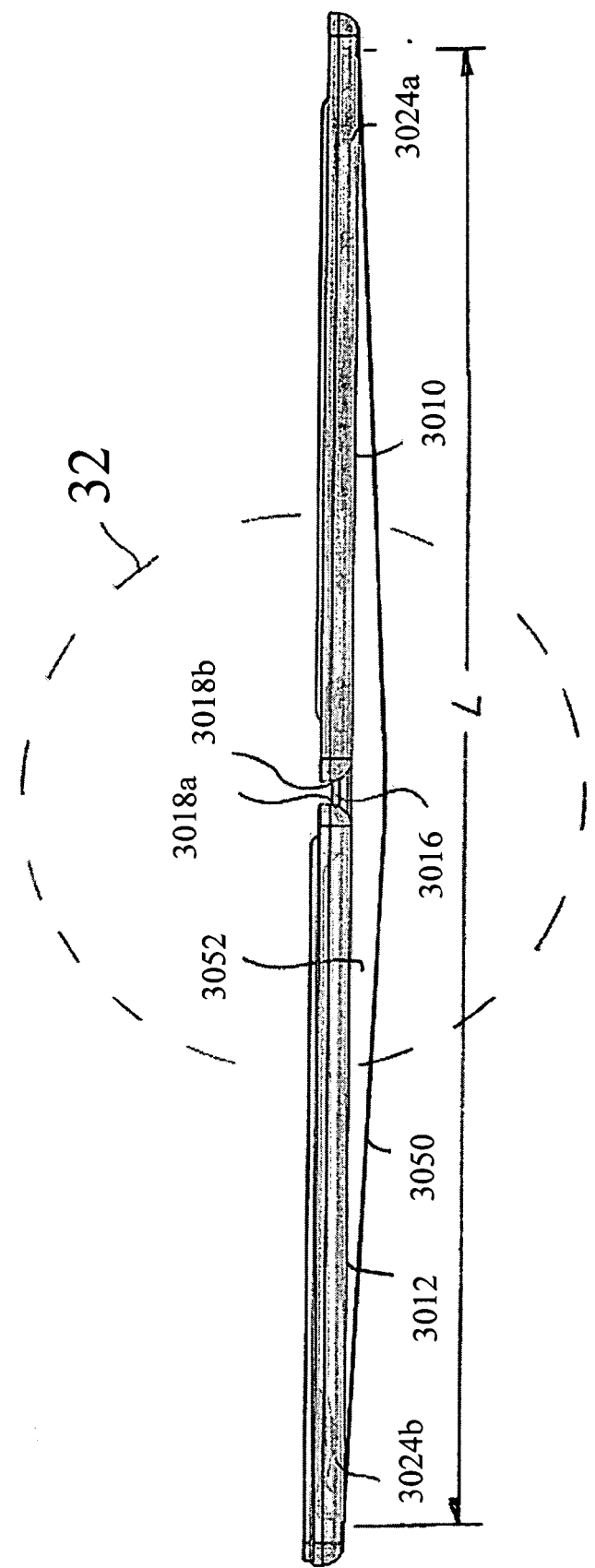
FIG. 31 is a side view of the compact disc package of FIG. 30 arranged in the open position.
Figure 34:
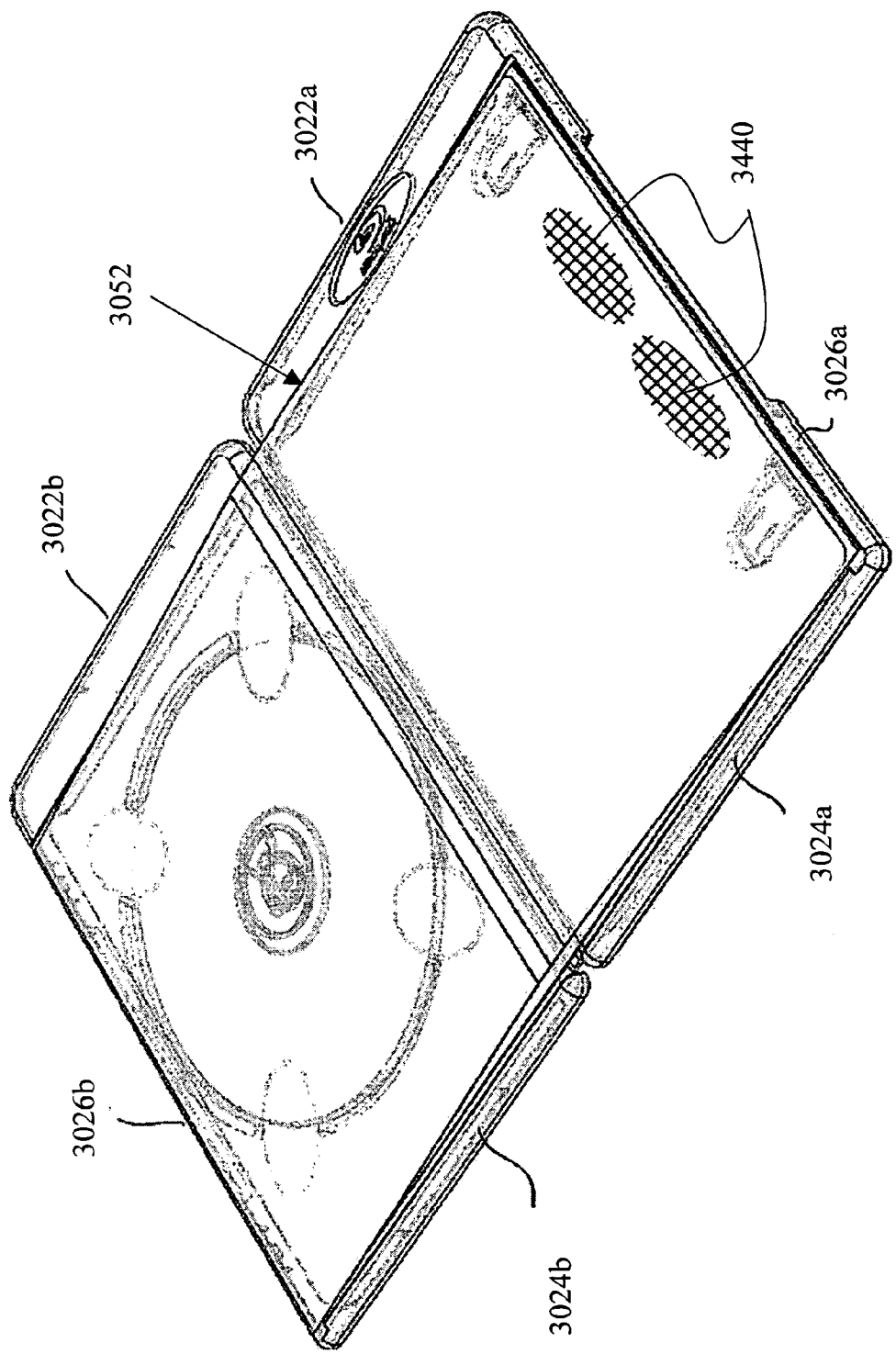
FIG. 34 is a perspective view of the package of FIG. 30, illustrating the back and front of the package having a clear film affixed thereto so as to form a pocket.

Package 3000 includes a base portion 3010, a cover portion 3012 and a spine section 3016. The base and the cover portions 3010, 3012 are joined to the spine section 3016 by living hinges 3018a and 3018b. As best seen in FIGS. 29, 31 and 34, the base and cover portions, 3010 and 3012 respectively, of package 3000, each include three curved end sections which are adapted to mate when package 3000 is in the closed position. More specifically, base portion 3010 includes top end 3022a, bottom end 3024a and side end 3026a which are adapted to mate with top end 3022b, bottom end 3024b and side end 3026b associated with cover portion 3012. Each of these end sections has a curved surface profile so that when the package 3000 is in the closed position (see FIG. 30) the package ends are rounded or curved.

Figure 32:
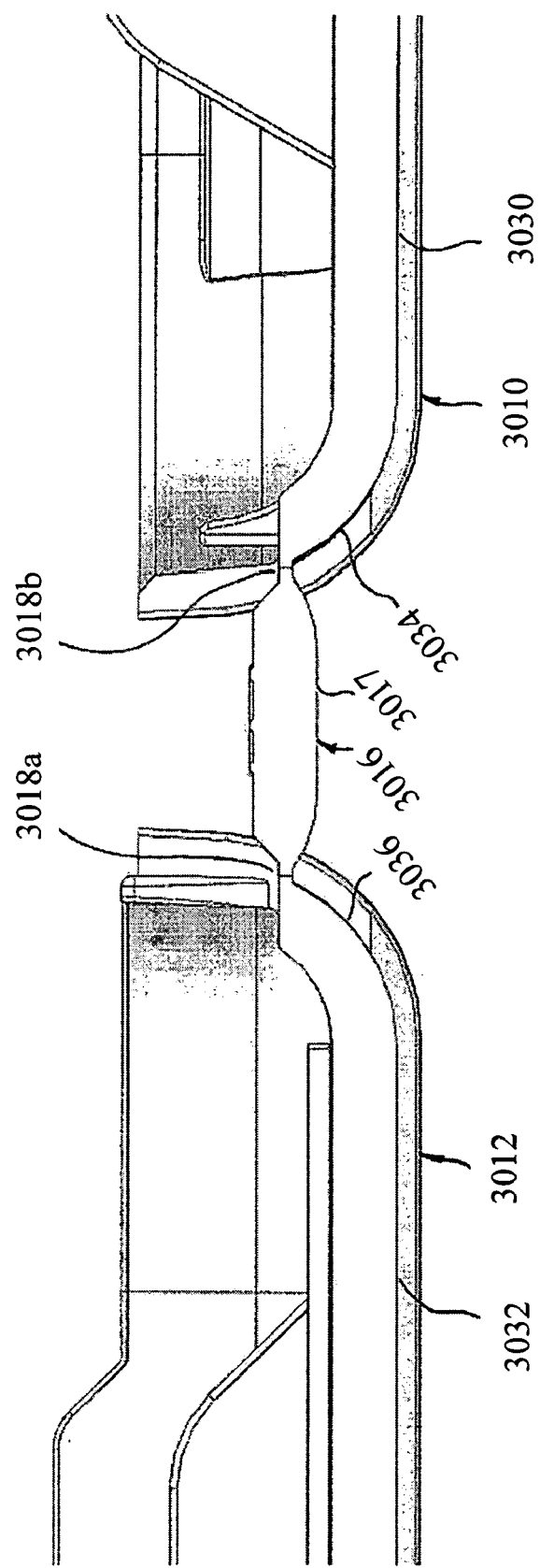
FIG. 32 is an enlarged view illustrating the configuration of the spine and living hinge assembly for the package of FIG. 30.

Unlike the previously described prior art package 2900, wherein the spine section 2916 is positioned in the same plane as the base portion 2912 and the cover portion 2914 when the package 2900 is in the open position, the spine portion 3016 and living hinges 3018a, 3018b of package 3000 are not located in the plane shared by the base and cover portions when the package is in the open position (see FIG. 32). Rather, the spine section 3016 is posited well above the plane shared by the outer surfaces 3030, 3032 of the base and cover portions 3010, 3012 and is located at approximately the mid-height of the base and cover portions.

Referring specifically to FIG. 32, it can be seen that the living hinges 3018a and 3018b are positioned at the end of an arc 3034, 3036 that extends from the outer surfaces 3030, 3032 of the cover and the base. Moreover, spine section 3016 includes a curved outer surface 3017 the has a profile which is configured to give the spine end of package 3000 a curved profile similar to the three other ends of the package 3000 when in the closed position.

The described living hinge and spine configuration create a package that has a shorter overall open position length than a traditional package, such as package 2900. This means that in certain embodiments, the graphic slip sheet may need to be shorter than the length of the opening of the trap 3052 (designated as "L" in FIG. 31) provided for by the package 3000 and the outer clear film 3050. As a result, however, the slip sheet can shift as the package is opened and closed.

As solution to the aforementioned problem with the slip sheet is shown in FIG. 34. An adhesive is pre-applied to an area 3440 on the inner surface of the slip sheet, preferably at the leading edge. The slip sheet is then inserted into the trap 3052 and located such that its leading edge is in the desired position. Then the adhesive is remotely activated using know techniques, such as for example, heat, UV light or pressure, to allow a portion of the slip sheet, in this example the leading edge, to be adhered to the cover portion 3012 of the package 3000. This will allow the cover section 3012 to have graphics that will not shift, but allow for the spine and back sections of the graphic slip sheet to slide between the cover and film as the package is opened and closed.

Figure 33:
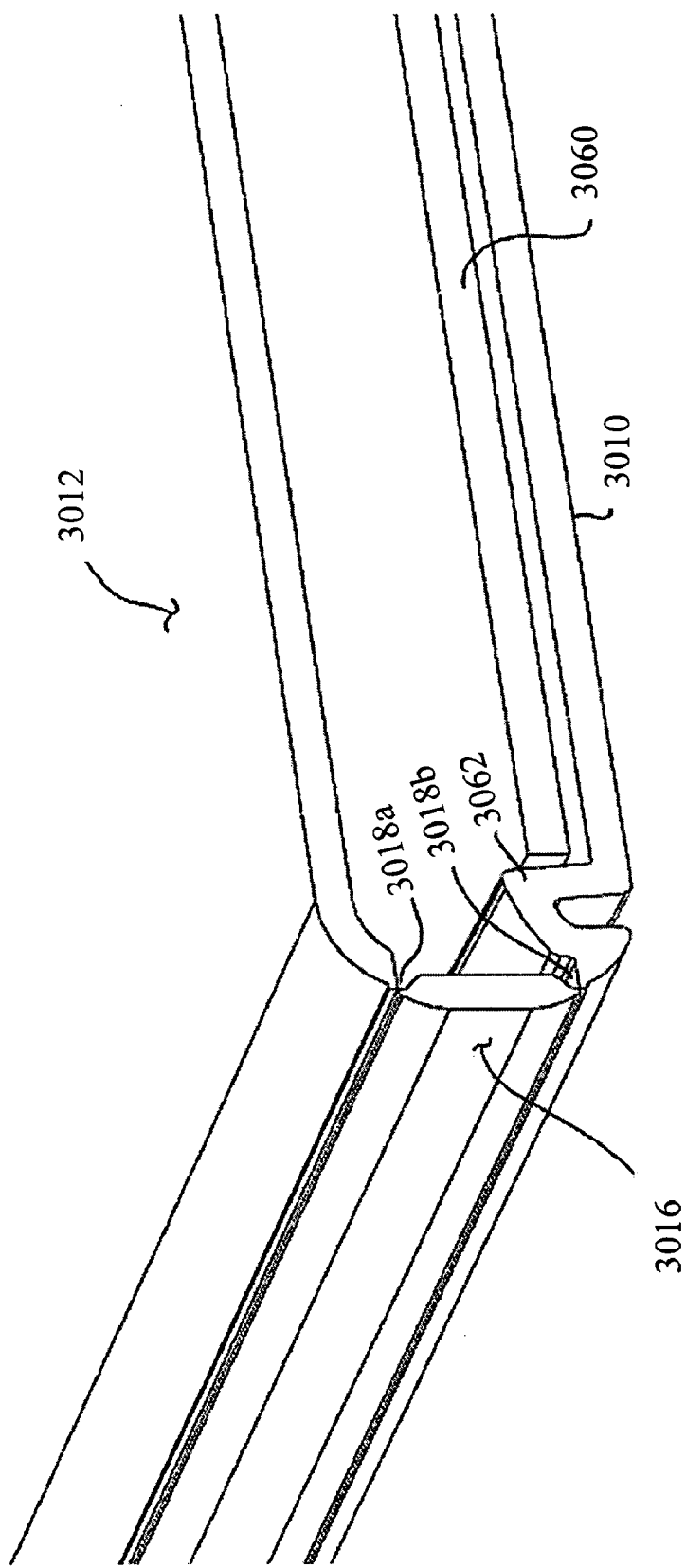
FIG. 33 is a cross-sectional view of the package of FIG. 30, illustrating the spine and living hinge assembly for the package and an integrated retainer for the insert tray.

Referring now to FIG. 33, which provides a cross-sectional view of package 3000. Those skilled in the art will readily appreciate that certain embodiments of the presently disclosed compact disc package can include a disc tray 3060, which is inserted into the base portion 3010 and provides a rosette for supporting the compact disc. In such embodiments, it is advantageous for the base section 3010 to further include a rib member 3062 for securing the disc tray 3060.

One advantage of the configuration of the package 3000 of FIGS. 30-34 is that the package 3000 includes a living hinge and spine configuration that it allows all of the package side walls, including the spine end, to share angled arced, curved and radiuses edges that are greater than the wall section or thickness of the package. Those skilled in the art will readily appreciate that the disclosed living hinge configuration and spine design can be readily applied to packages of a variety of thicknesses, including the traditional 7 mm to 15 mm packages.

Another advantage of the configuration of package 3000 is that it includes a cost effective method for securing a portion of the slip sheet to the cover while allowing the remaining portion of the sheet to move freely, as needed, when the package is opened and closed.

Figure 35:
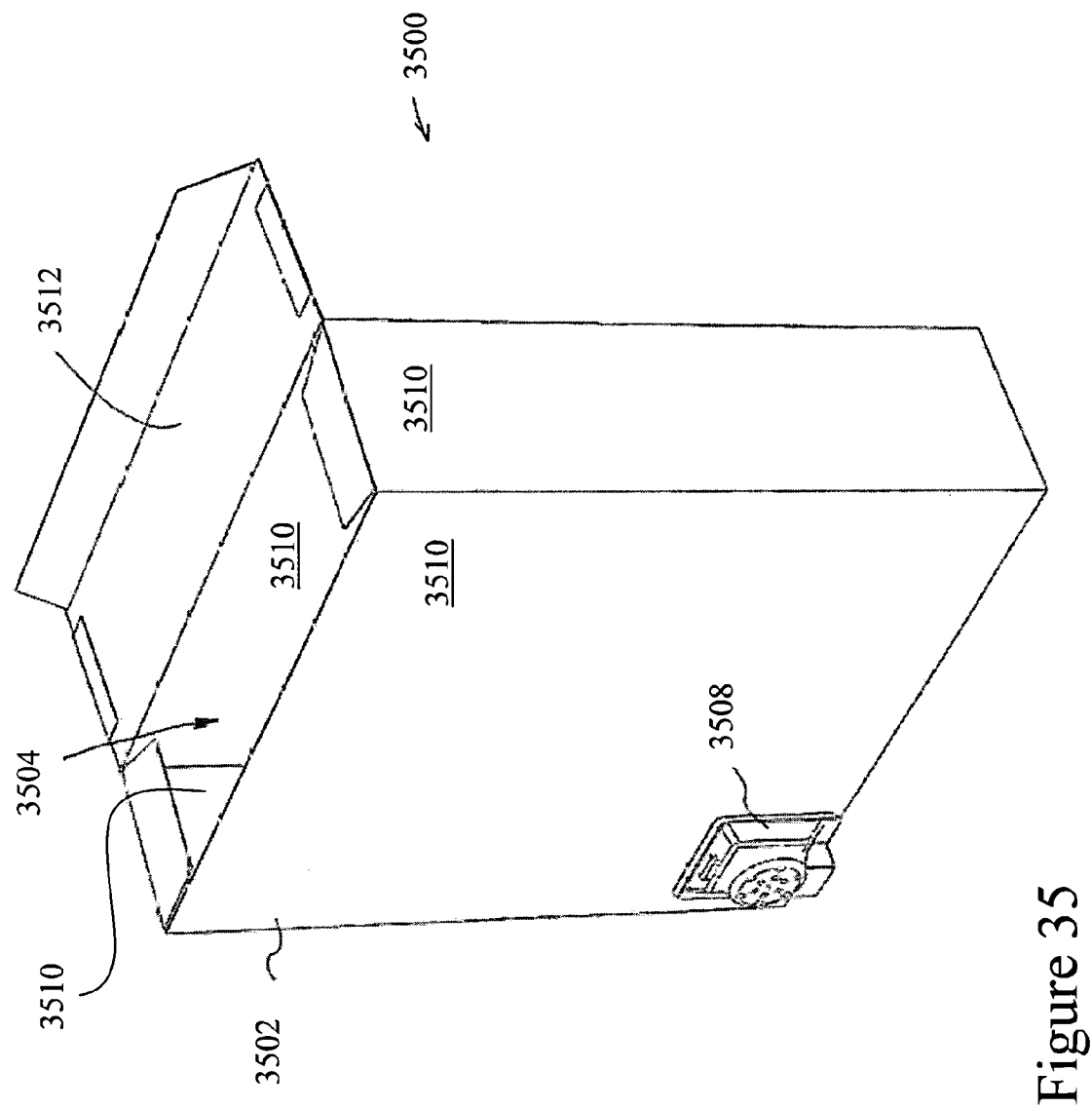
FIG. 35 is an isometric view of a tamper evident package in accordance with the present invention.
Figure 36:
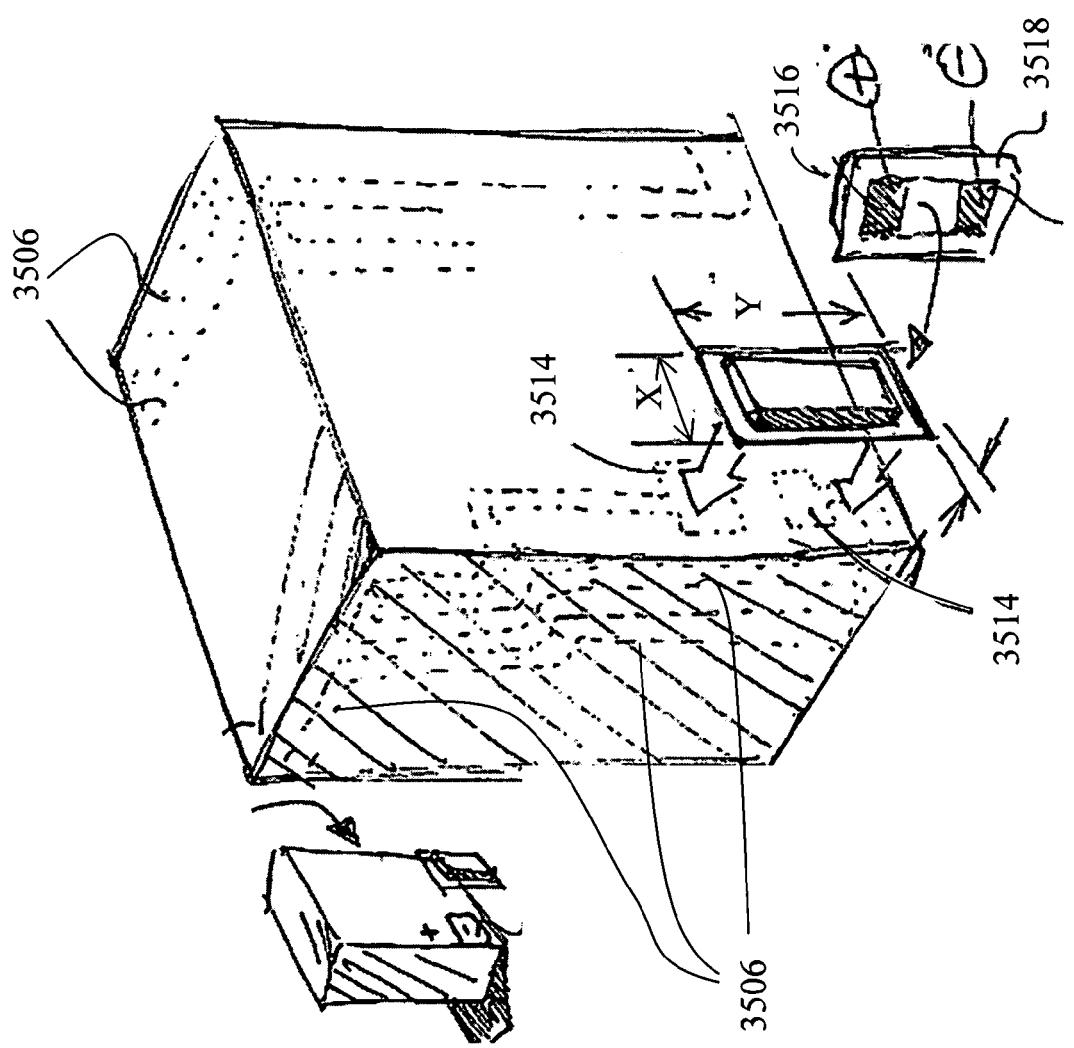
FIG. 36 is series a schematic view of the package of FIG. 35, illustrating a protective conductive grid.

Referring now to FIGS. 35 and 36, a further tamper evident package 3500 in accordance with the invention is provided, which is generally parallelepipedal in shape. Those skilled in the art will readily recognize that not all sides of the package 3500 need be parallelograms and any package configuration is possible without departing from the scope of the subject technology. In brief overview, the package 3500 is useful for controlling inventory, preventing theft and the like by having means for preventing tampering and activating an alarm if tampering and/or theft is attempted. The package 3500 includes a box or container 3502 defining an interior 3504 for storing an item (not shown). The item could be any item to be presented for sale on a shelf and the configuration of the package 3500 specifically adapted thereto. An electrical grid 3506 (FIG. 36) couples to the container 3502 such that the grid 3506 must be broken to remove the item from the interior 3504. An alarm module 3508 connects to the grid 3506 triggers upon breaking of the grid 3506. The alarm module 3508 can emit an audible alarm, a visual alarm or both.

In one embodiment, the package or container 3502 is formed from a single blank of cut, punched, crease-lined or like substrate, such as plastic, cardboard and the like. The container 3502 includes four consecutive main panels 3510 and two opposing closure panels 3512. Each of the panels 3510, 3512 may have one or more tabs to secure the panels 3510, 3512 in the closed condition. Glue and other well known means are applied to fasten the panels 3510, 3512 closed.

The grid 3506 is series of electrically conductive lines that extend around the container 3502. Grid connections extend across the panels 3510, 3512 and may be internal, external, and/or intermediate the container 3502. Consequently, the grid 3506 forms a circuit that must be broken in order to remove the item from the package 3500. For example, the alarm module 3508 is triggered when the conductive layers or conductive traces of the grid 3506 are cut into by a knife. In one embodiment, the container 3502 is made from a blank having portions of conductive paper. In another, the container 3502 is printed with areas of conductive inks. In still another, the container 3502 is overlaid with conductive tape before or after folding.

The alarm module 3508 attaches to contact pads 3514 formed in the grid 3506. The alarm module 3508 has an outer housing containing electronics, batteries, and a sound emitting element. Two conductive surfaces 3516 on the housing connect the alarm module 3508 to the contact pads of the grid 3506. An adhesive area 3518 or other mechanism is used to attach the alarm module 3508 to the container 3502. The alarm module 3508 can be externally or internally applied to the container 3502 and or incorporated into the container 3502. The alarm module 3508 can be designed to be reused or disposable. The alarm module 3508 may be applied during fabrication of the container 3502 or later at the retailer. In one version having a reusable alarm module 3508, the alarm module is secured to the container 3502 magnetically.

When assembled, the package 3500 surrounds the stored item and if the package is tampered with such as by the grid 3506 being broken or the alarm module 3508 removed, the electronics of the alarm module 3508 activate the sound emitting element. In one embodiment, in order to allow removal of the alarm element 3508, either from the container 3508 or from the store as the case may be, the alarm module 3508 is deactivated by application of a magnetic field thereto at the store register. In another embodiment, the alarm module 3508 is deactivated by application of an RFID signal thereto.

It is also envisioned that the alarm module 3508 can be inactive during shipment and shelf storage but when removed from the shelf, the alarm module 3508 becomes active. For example, a transmitter to generate an RFID signal or a magnetic field can be present in the shelf area. As such, the alarm module 3508 can recognize this condition and be deactivated as a result. Upon removal from the shelf, i.e., removal from the RFID signal or magnetic field, the alarm module 3508 activates.

Figure 37:
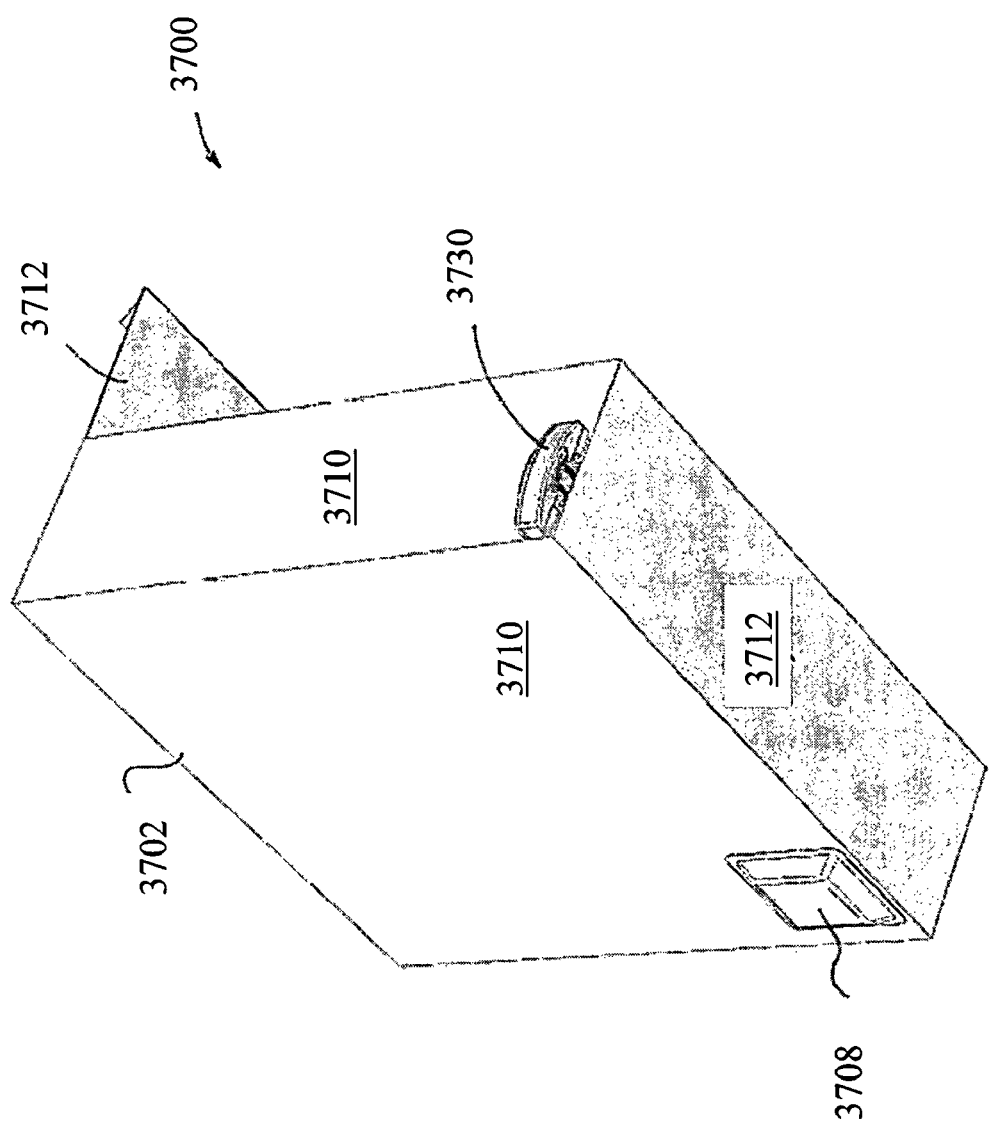
FIGS. 37-38 are views of another tamper evident package with a removable security tag in accordance with the present invention.
Figure 38:
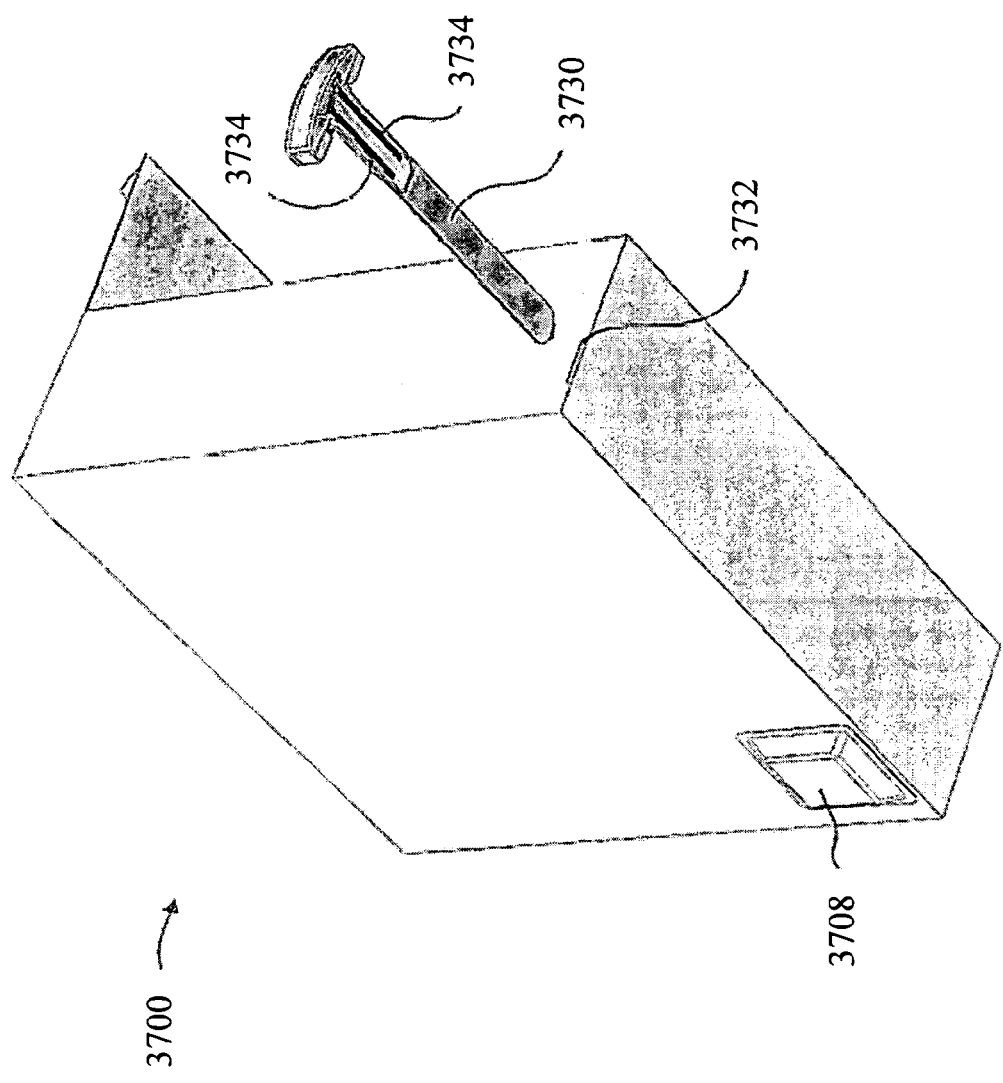

Referring now to FIGS. 37-38, a series of views of another tamper evident package 3700 with a removable security tag 3730 is shown. As will be appreciated by those of ordinary skill in the pertinent art, the package 3700 utilizes the same principles of the package 3500 described above. Accordingly, like reference numerals preceded by a "37" instead of the numeral "35" are used to indicate like elements. The primary difference of the package 3700 in comparison to the package 3500 is that the package 3700 includes the removable security tag 3730. The removable security tag 3730 provides in store anti-theft security to the package 3700. The removable security tag 3730 has an alarm that is triggered when the removable security tag 3730 is removed from the package 3700, the package 3700 is opened or the product is removed from the package 3700, and when the package 3700 is cut and or torn. The security tag 3730 can include button batteries, a piezo sound chip, a small circuit board and two contacts (e.g. 3934) positioned on the dagger end of the tag.

The container 3702 of package 3700 has an area of conductive ink or conductive material (e.g., the grid 3706) positioned on the inner surface such that when the removable security tag 3730 is inserted into a slot 3732 formed in the container 3702, contacts 3734 on the removable security tag 3730 operatively connect to and complete the grid 3706 such that when the removable security tag 3730 is removed from the slot 3732, the grid is broken and the alarm module 3708 is triggered.

In another embodiment, the alarm module 3708 is configured to be active or triggered when the grid 3706 is completed. The contacts 3734 of the removable security tag 3730 pass over the grid 3706 but are positioned such that the grid 3706 must be completed to remove the removable security tag 3730. Thus, when a thief tries to remove the removable security tag 3730 from the package 3700, the alarm module 3708 is triggered. It is also envisioned that the removable security tag 3730 houses an alarm. The alarm of the removable security tag 3730 could be set off by completion of the circuit across the contacts 3734 or opening of the circuit. In this instance, the contacts 3734 need not necessarily interact with the grid 3706 but only appropriate conductive area need to be present on the container 3702.

Figure 39:
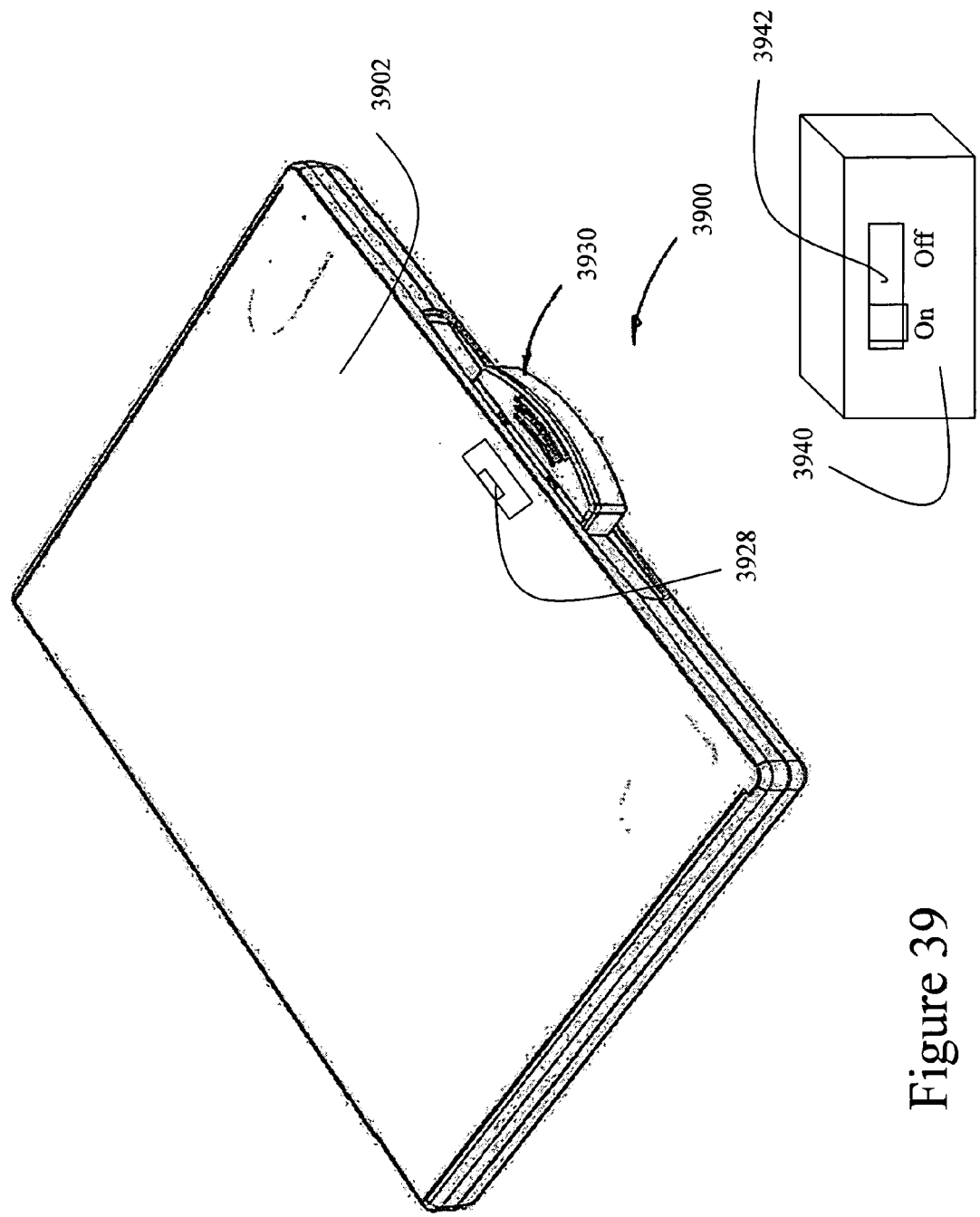
FIGS. 39-41 are views of a media disc, such as a compact disc, package with a removable security tag in accordance with the invention.
Figure 40:
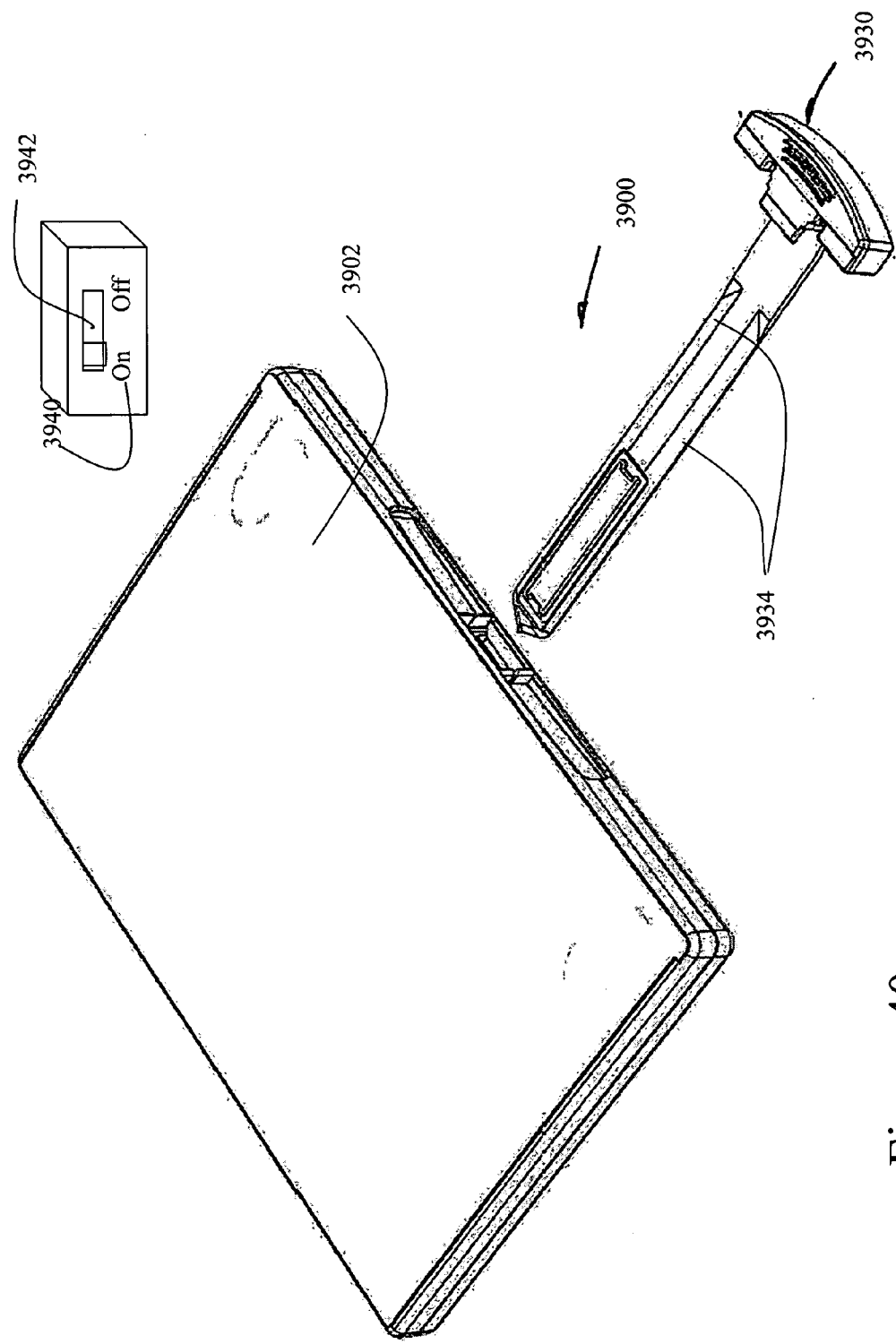
Figure 41:
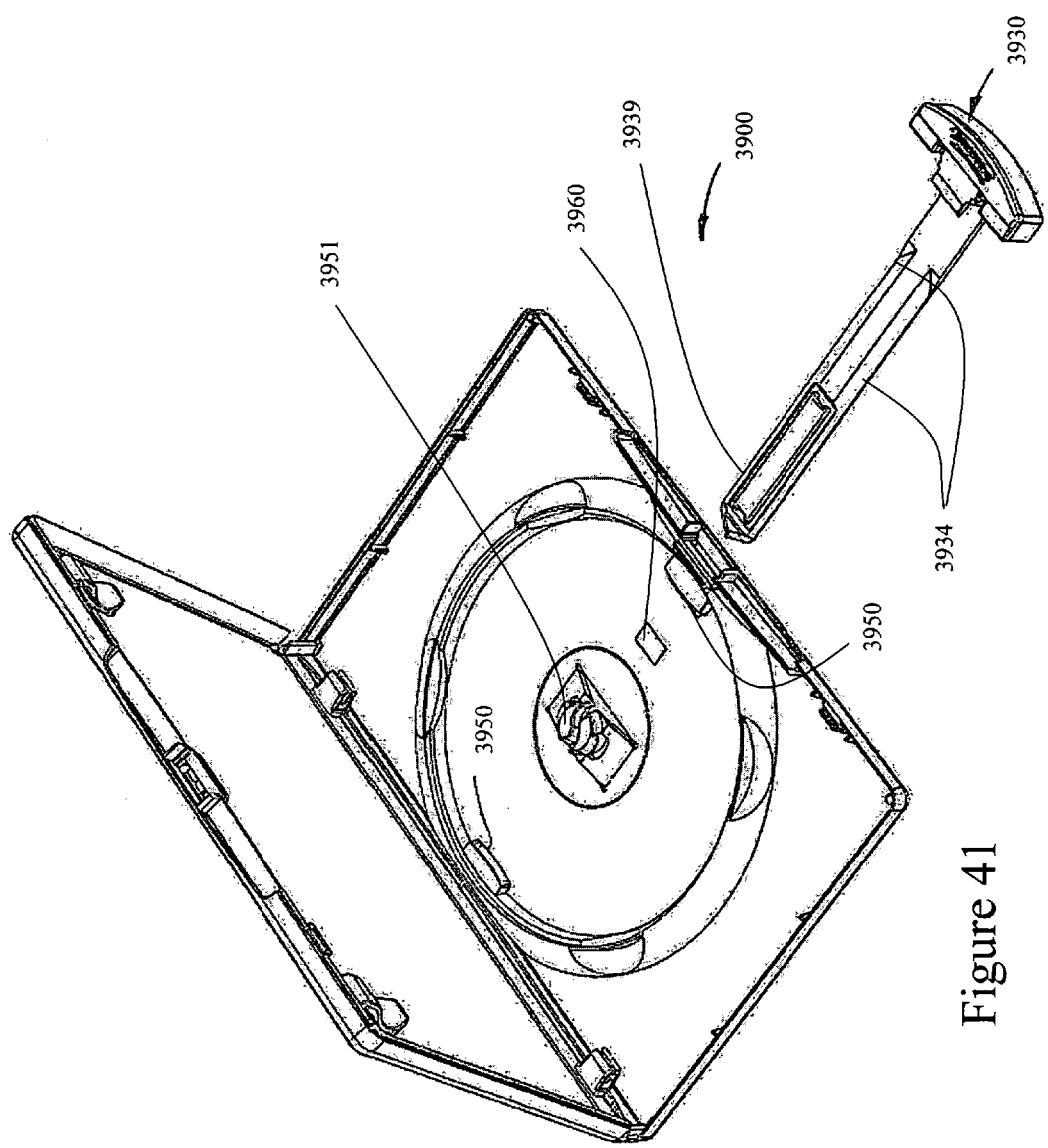

The removable security tag 3730 is remotely suppressed by a RF signal to allow the insertion or attachment and removal of the removable security tag 3730 to the package 3700. The RF signal transmitter (not shown in FIGS. 37-38 but a similar transmitter is shown in FIGS. 39-41) that suppresses the removable security tag 3730 is located at a cash register, other location in a store or simply carried by store personnel. This allows the removable security tag 3730 to be removed from the package 3700 by employees without using any special tools or fixtures. The register clerk needs to simply remove the removable security tag 3730 when the transmitter is located near the register.

In another embodiment, the conductive traces of the grid 3706 are configured as alternating lines of positive and negative traces that when you cut across the lines, the alarm on the removable security tag 3730 is set off. This alarm condition is in addition to setting of the alarm when if the removable security tag 3730 is removed from the package 3700. In still another embodiment, the container 3702 is fabricated from conductive paper or paperboard. The paperboard sheet material has multiple layers that are positive on one side, a middle barrier that is non conductive and a negative back surface. A package 3700 using the conductive material has at least one panel or flap that is folded back onto itself such that both positive and negative layers share a common surface to allow an electronic device to be connected thereto. In other words, the material is folded so that the positive and negative layers form contact points for connection of an alarm module 3708 or removable security tag 3730.

Referring now to FIGS. 39-41, a series of views of another security package 3900 with a removable security tag 3930 is shown. As will be appreciated by those of ordinary skill in the pertinent art, the package 3900 utilizes the same principles of the packages 3500, 3700 described above. Accordingly, like reference numerals preceded by the numeral "39" instead of the numeral "35" or "37" are used to indicate like elements. The primary difference of the package 3900 in comparison to the packages 3500, 3700 is that the package 3900 only utilizes the removable security tag 3930, which may or may not fully incorporate the functions of the alarm modules 3508, 3708. The package 3900 includes apertures 3950 through which the dagger end 3939 of the tag 3900 passes. The end 3939 of the tag 3900 also passes under the rosette 3951, thereby preventing the rosette from being depressed, and a media disc removed therefrom without prior removal of the security tag 3900. As set forth above, a region of conductive material 3960 is provided on the surface of the package 3900, which meets contacts 3934, when the tag 3930 is inserted into the container 3900.

A plurality of the removable security tags 3930 can be sold as a kit along with a container 3902, which is specifically designed therefor and a transmitter 3940. The transmitter 3940 emits a signal that is received by the removable security tag 3930 to disable and enable the removable security tag 3930 as desired. A switch 3942 allows turning the transmitter 3940 on and off. The removable security tag 3930 is secured in the slot in the container 3902 by a deflectable protrusion 3928 on the container 3902. The deflectable protrusion 3928 couples to a hollow or detent formed on the removable security tag 3930. To remove the removable security tag 3930, a user pulls outward on the removable security tag 3930 with sufficient force to deflect the protrusion 3928 out of the way. Naturally, the precise shape of the security tag 3930 can vary as desired. The shape can be substantially rectangular prism, or have one or more arcuate contours, for example. Further, the location of the contacts 3934 can be configured as needed or desired.

Figure 42:
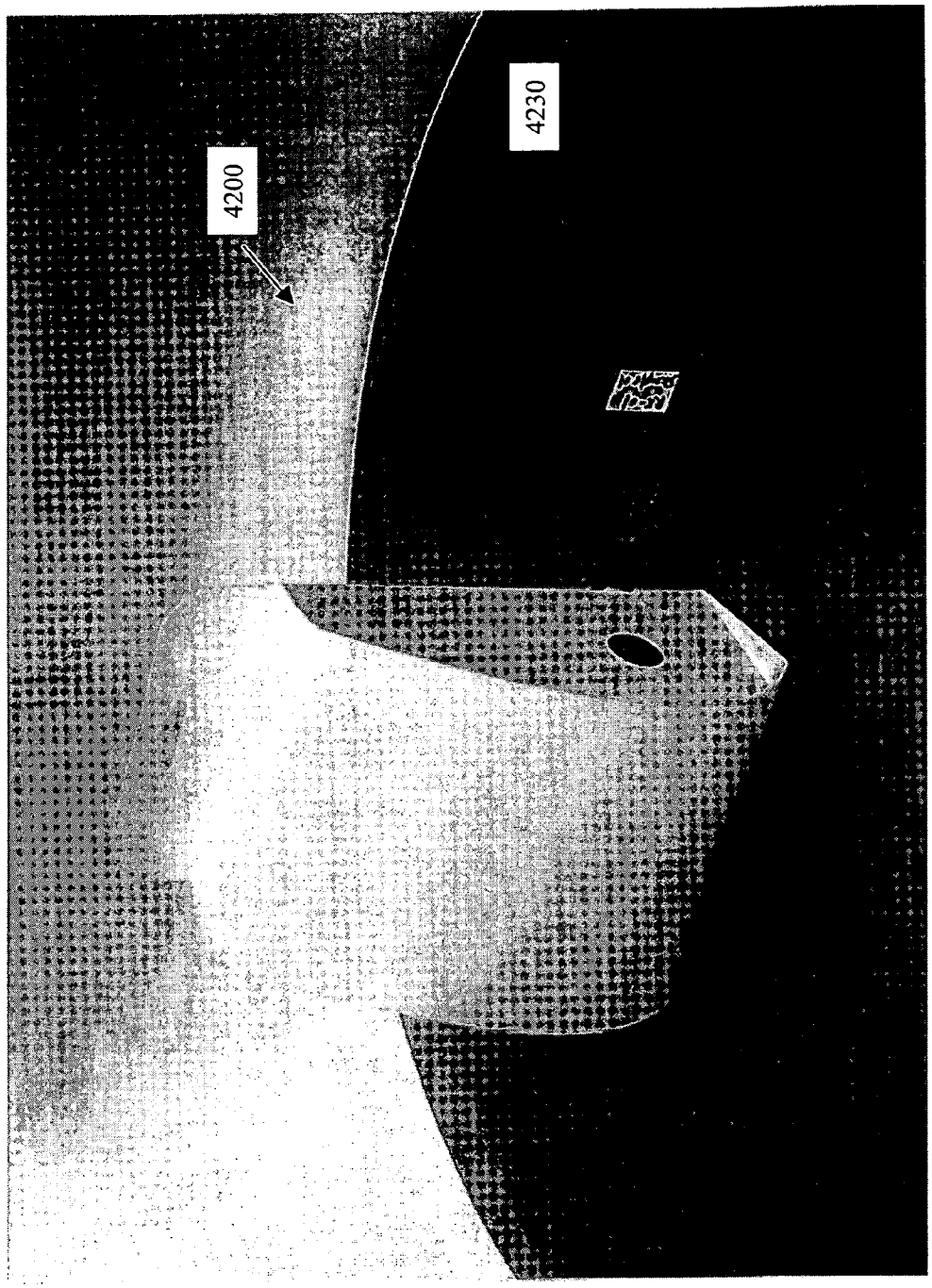
FIG. 42 is a view of another package with a removable security tag in accordance with the invention.

FIG. 42 illustrates an example package 4200, which is blow molded or otherwise formed by sheet material that includes a security tag 4230 in accordance with the invention, as described above, for example in connection with FIGS. 39-41.

Figure 43:
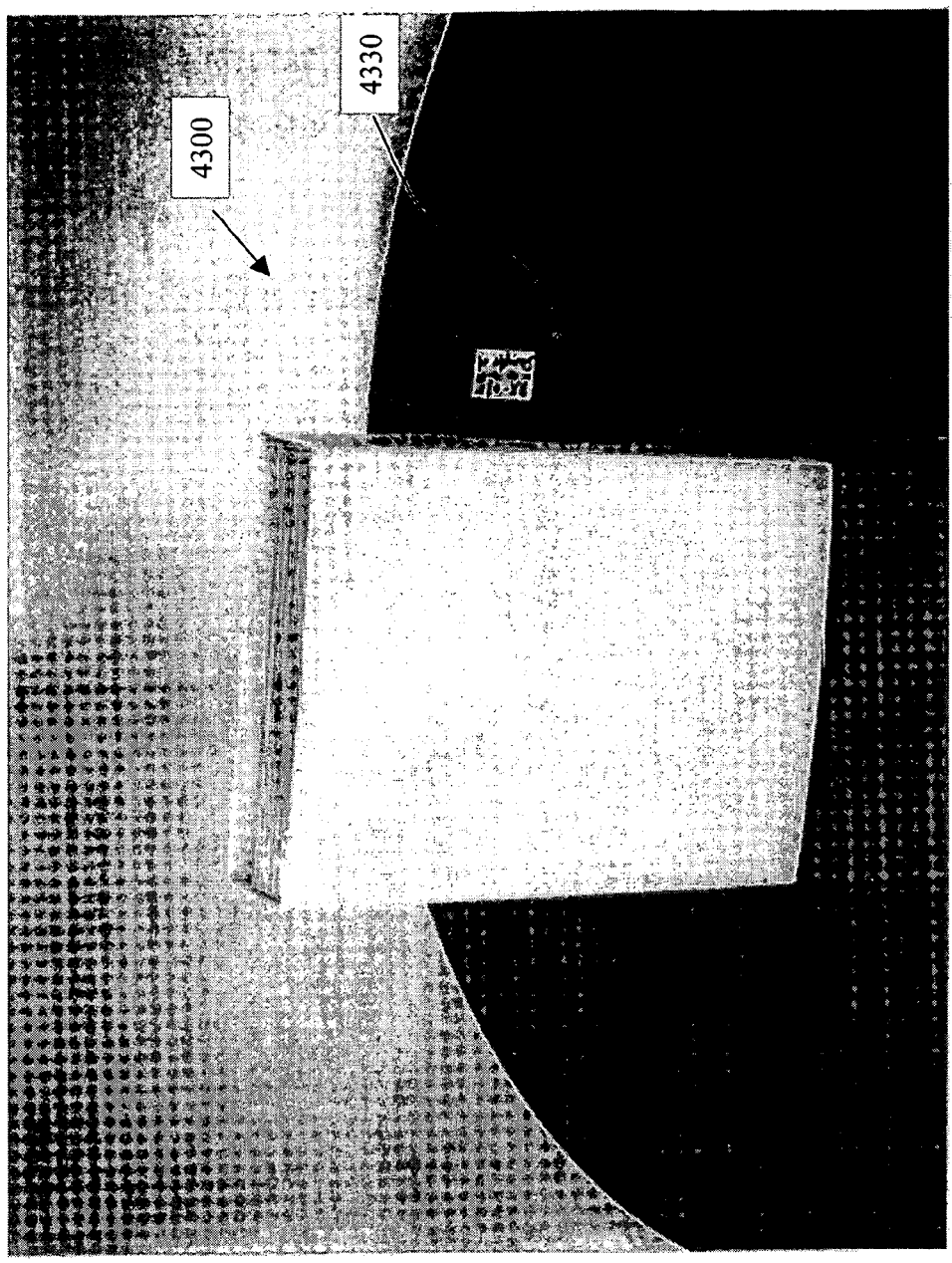
FIG. 43 is a view of another package in accordance with the invention, particularly suited for storage of multiple media discs, the package having a removable security tag in accordance with the invention.

FIG. 43 illustrates a package 4300 for carrying multiple media discs, such as DVDs, for example, including a security tag 4330 in accordance with the invention, as described above, for example in connection with FIGS. 39-41.

The illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

While the invention has been described with respect to preferred embodiments, those skilled in the art will readily appreciate that various changes and/or modifications can be made to the invention without departing from the spirit or scope of the invention.

What is claimed is:

1. A tamper-evident case, comprising:
    a) a base portion;
    b) a cover portion hingedly connected to said base portion;
    c) a recess defined by a first side of said cover portion and a first side of said base portion;
    d) a security bar hingedly connected to one of said sides and aligned with said recess; and
    e) a security mechanism comprising at least one locking element for releasably securing said base portion to said cover portion, said at least one locking element foldably attached by way of a lock hinge to said security bar and rotatable about said lock hinge relative to said security bar from a folded position
    in which said at least one locking element is folded against said security bar and does not secure said base portion to said cover portion, to an unfolded position in which said at least one locking element is unfolded away from and generally perpendicular to said security bar and engages with a mating component to secures said base portion to said cover portion.

2. The tamper-evident case of claim 1, wherein said at least one locking element in said folded position is folded against said security bar and generally parallel to said security bar and does not secure said base portion to said cover portion, and said at least one locking element in said unfolded position is unfolded away from said security bar and generally perpendicular to said security bar and secures said base portion to said cover portion.

3. A tamper-evident case, comprising:
    a) a base portion;
    b) a cover portion hingedly connected to said base portion;
    c) a recess defined by a first side of said cover portion and a first side of said base portion;
    d) a tamper-evident security bar hingedly connected to one of the first side of said cover portion and a first side of said base portion, and aligned with said recess; and
    e) a security mechanism comprising at least one locking element extending from the security bar for engaging the other of the first side of said cover portion and a first side of said base portion, for securing said base portion to said cover portion;
    wherein said at least one locking element is foldably attached by way of a lock hinge to said security bar and rotatable about said lock hinge relative to said security bar from a folded position to an unfolded position generally perpendicular to said security bar;
    wherein in said folded position said at least one locking element does not secure said base portion to said cover portion; and
    wherein in said unfolded position said at least one locking element engages with a mating component to secure said base portion to said cover portion.

4. The tamper-evident case of claim 3, wherein the tamper-evident security bar is severable from the cover or base portion to which it is hingedly connected.

5. The tamper-evident case of claim 3, wherein in said folded position the at least one locking element is inwardly folded toward the security bar to enable an unlocked, closed position for the case.

6. The tamper-evident case of claim 3, wherein the at least one locking element includes at least one pawl that engages a corresponding aperture formed in the other of the first side of said cover portion and said first side of said base portion.

7. The tamper-evident case of claim 6, wherein the at least one locking element and hinge of the security bar are configured such that when the at least one locking element engages the corresponding aperture, the security bar must be severed along the hinged connection in order to open the case.

8. A tamper-evident case, comprising:
    a) a base portion;
    b) a cover portion hingedly connected to said base portion;
    c) a recess defined by a first side of said cover portion and a first side of said base portion;

d) a security bar hingedly connected to one of said sides and aligned with said recess, and moveable between closed and open positions of the security bar; and e) a security mechanism comprising at least one locking element hingedly attached to said security bar for releasably securing said base portion to said cover portion;

wherein said security bar is flush with said first side of said cover portion and with said first side of said base portion when said security bar is in said closed position with said at least one locking element engaging with a mating component and securing said base portion to said cover portion, and wherein said security bar is also flush with said first side of said cover portion and with said first side of said base portion when said security bar is in said closed position with said at least one locking element not securing said base portion to said cover portion.

9. The tamper-evident case of claim 8, wherein the tamper-evident security bar is severable from the cover or base portion to which it is hingedly connected.

10. The tamper-evident case of claim 8, wherein the at least one locking element is inwardly foldable by way of a lock hinge toward the security bar to enable an unlocked, closed position for the case.

11. The tamper-evident case of claim 8, wherein the at least one locking element includes at least one pawl that engages a corresponding aperture formed in the other of the first side of said cover portion and said first side of said base portion.

12. The tamper-evident case of claim 11, wherein the at least one locking element and hinge of the security bar are configured such that when the at least one locking element engages the corresponding apertures, the security bar must be severed along the hinged connection in order to open the case.

\* \* \* \* \*